(12) United States Patent
Gresset et al.

(10) Patent No.: US 8,780,818 B2
(45) Date of Patent: *Jul. 15, 2014

(54) METHOD AND DEVICE FOR ALLOCATING, BY A TELECOMMUNICATION DEVICE, AT LEAST A FIRST AND A SECOND CONSECUTIVE CHANNEL ELEMENTS OF A GROUP OF CHANNEL ELEMENTS OF A CHANNEL RESOURCE TO A DESTINATION

(75) Inventors: Nicolas Gresset, Rennes Cedex (FR); Loic Brunel, Rennes Cedex (FR)

(73) Assignees: Mitsubishi Electric Information Technology Centre Europe B.V., Schiphol Rijk (NL); Mitsubishi Electric Corporation, Tokyo (JP)

( * ) Notice: Subject to any disclaimer, the term of this patent is extended or adjusted under 35 U.S.C. 154(b) by 1211 days.

This patent is subject to a terminal disclaimer.

(21) Appl. No.: 12/595,966

(22) PCT Filed: Apr. 23, 2008

(86) PCT No.: PCT/EP2008/003255
§ 371 (c)(1),
(2), (4) Date: Oct. 15, 2009

(87) PCT Pub. No.: WO2008/131897
PCT Pub. Date: Nov. 6, 2008

(65) Prior Publication Data
US 2010/0303028 A1 Dec. 2, 2010

(30) Foreign Application Priority Data

Apr. 25, 2007 (EP) .................................... 07008408
Apr. 27, 2007 (EP) .................................... 07008627

(51) Int. Cl.
*G01R 31/08* (2006.01)
*H04W 4/00* (2009.01)

(52) U.S. Cl.
USPC .......................................... 370/329; 370/341

(58) Field of Classification Search
USPC ......................................................... 370/329
See application file for complete search history.

(56) References Cited

U.S. PATENT DOCUMENTS

| | | | | |
|---|---|---|---|---|
| 6,408,009 B1 * | 6/2002 | Campbell et al. | ............. | 370/461 |
| 6,628,631 B1 * | 9/2003 | Mazawa et al. | ................ | 370/331 |
| 6,657,949 B1 * | 12/2003 | Jones et al. | .................. | 370/205 |
| 6,928,066 B1 | 8/2005 | Moon et al. | | |
| 7,304,597 B1 * | 12/2007 | LaMarche | ..................... | 341/155 |
| 8,547,909 B1 * | 10/2013 | Yew et al. | ..................... | 370/329 |

(Continued)

OTHER PUBLICATIONS

U.S. Appl. No. 12/665,060, filed Dec. 17, 2009, Brunel, et al.

*Primary Examiner* — Gerald Smarth
(74) *Attorney, Agent, or Firm* — Oblon, Spivak, McClelland, Maier & Neustadt, L.L.P.

(57) ABSTRACT

A method for allocating, by a telecommunication device, at least first and second channel elements of a group of channel elements of a channel resource to a destination. The telecommunication device: selects, for the first channel element, a first randomization function according to the position of the first channel element within the group of channel elements and according to the destination; selects, for the second channel element, a second randomization function according to the position of the second channel element within the group of channel elements and according to the destination; processes the data to be included in the first channel element by the first randomization function and processes the data to be included in the first channel element by the second randomization function; and transfers the processed data.

27 Claims, 8 Drawing Sheets

(56) References Cited

U.S. PATENT DOCUMENTS

| | | | |
|---|---|---|---|
| 2002/0057653 A1* | 5/2002 | Dolan et al. | 370/252 |
| 2002/0082006 A1* | 6/2002 | Narvanen et al. | 455/426 |
| 2004/0095880 A1* | 5/2004 | Laroia et al. | 370/208 |
| 2004/0095902 A1* | 5/2004 | Laroia et al. | 370/328 |
| 2004/0218685 A1 | 11/2004 | Rainbolt et al. | |
| 2005/0094615 A1 | 5/2005 | Kim et al. | |
| 2006/0045169 A1* | 3/2006 | Kim | 375/144 |
| 2006/0233280 A1* | 10/2006 | Tynderfeldt et al. | 375/299 |
| 2007/0002812 A1 | 1/2007 | Malkamaki et al. | |
| 2007/0030917 A1* | 2/2007 | Farag | 375/265 |
| 2007/0189484 A1* | 8/2007 | Gayde et al. | 379/201.01 |

* cited by examiner

|        |      | UE1 ||  UE2 ||
|--------|------|-----|-----|-----|-----|
|        |      | 45a | 45b | 46a | 46b |
| 40 | Data   | 001 | 001 | 010 | 010 |
| 41 | Mask   | 001 | 001 | 011 | 011 |
| 42 | Result | 000 | 000 | 001 | 001 |
| 43 | UE2 Mask | 011 | 011 | 011 | 011 |
| 44 | Result   | 011 | 011 | 010 | 010 |
|    |          | 47a | 47b | 48a | 48b |

Fig. 4

|        |      | UE1 ||  UE2 ||
|--------|------|-----|-----|-----|-----|
|        |      | 55a | 55b | 56a | 56b |
| 50 | Data   | 001 | 001 | 010 | 010 |
| 51 | Mask   | 101 | 110 | 010 | 011 |
| 52 | Result | 100 | 111 | 000 | 001 |
| 53 | UE2 Mask | 000 | 001 | 010 | 011 |
| 54 | Result   | 100 | 110 | 010 | 010 |
|    |          | 57a | 57b | 58a | 58b |

Fig. 5

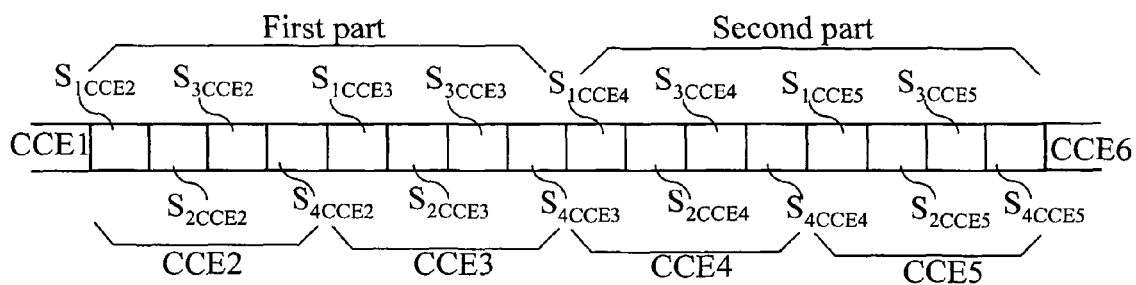
Fig. 8
Fig. 9
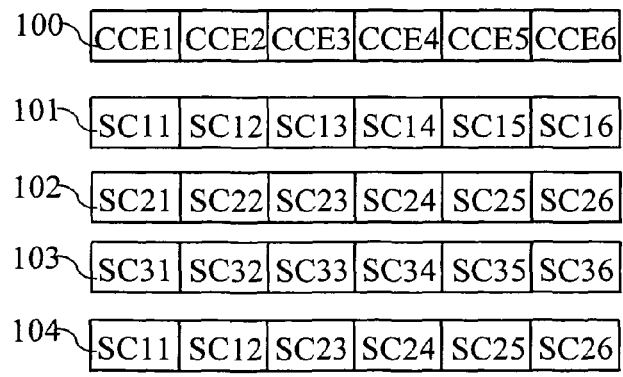
Fig. 10

METHOD AND DEVICE FOR ALLOCATING, BY A TELECOMMUNICATION DEVICE, AT LEAST A FIRST AND A SECOND CONSECUTIVE CHANNEL ELEMENTS OF A GROUP OF CHANNEL ELEMENTS OF A CHANNEL RESOURCE TO A DESTINATION

The present invention relates to a method and a device for allocating, by a telecommunication device, at least a first and a second consecutive channel elements of a group of channel elements of a channel resource to a destination.

Correlatively, the present invention relates to a method and a device for determining if at least a first and a second channel elements of a group of channel elements of a channel resource are allocated to a destination by a first telecommunication device.

In some classical wireless cellular telecommunication networks, a base station communicates with at least one mobile terminal which is located within the coverage area of the base station. The base station allocates parts of the telecommunication network channel resource to the mobile terminal.

The channel resource is defined as the amount of frequency bandwidth, time, or spatial dimensions if the base station and the mobile terminals have several antennas. A part of the channel resource is named hereinafter a channel element. A channel element is a predefined subdivision of the channel resource.

Each channel element is comprised of resource elements of the channel resource. As example, in case of single-antenna OFDM transmission, a resource element is a tone or sub-carrier of an OFDM symbol.

The base station needs to indicate to each mobile terminal which channel element or elements is or are allocated to the mobile terminal. When plural channel elements are allocated to a mobile terminal, these channel elements are channel elements of a subset of the group of channel elements.

A channel element is either allocated for downlink and/or uplink transmission. A downlink transmission is a transmission from the base station to one or several mobile terminals. An uplink transmission is a transmission from a mobile terminal to the base station.

In order to indicate to each mobile terminal which channel element or elements is or are allocated to the mobile terminal, the base station uses a group of control channel elements which is composed of control channel elements.

Each control channel element size allows the transmission of information representative of the channel coding, like convolutional or turbo coding, and/or of the modulation scheme and/or of a location of a subset of the group of channel elements and/or of a space time code to be used by the destination for a subset of the group of channel elements.

On each control channel element data are mapped. The data are information and a classical cyclic redundancy checksum (CRC) of the information, the information and the CRC being coded and modulated.

The CRC is a block code used to check if there remain errors after decoding.

The resource allocation maps other data to be transmitted to each mobile terminal on a subset composed of channel elements of the group of channel elements.

One or plural control channel elements are allocated to a given mobile terminal as example according to the distance separating the base station and the mobile terminal or according to the attenuation or interference which exist in the communication link between the base station and the mobile terminal or according to the amount of data to be transferred.

As example, a lower code rate may be used in order to improve the robustness of the transmission of the coded and modulated information combined with CRC intended to be mapped in a control channel element or the coded and modulated information combined with CRC are duplicated and mapped on at least one other control channel element which is allocated to the mobile terminal. When plural control channels elements are allocated to a given mobile terminal, these control channel elements are consecutive or not.

In order to enable each mobile terminal to recover both its allocated subset of channel elements and data through the control channel elements, the base station indicates, in the data mapped in each control channel element, the identifier of the destination mobile terminal or masks the data formed by coded and modulated information combined with CRC with the identifier of the mobile terminal. The masked data are mapped in each control channel element.

Each mobile terminal has to recover both its allocated subset of channel elements and data through the control channel elements. More precisely, each mobile terminal has to know the number of control channel elements which have been allocated to it and which control channel element or elements have been allocated to it. When plural control channel elements are allocated to a mobile terminal, the control channel elements allocated to the mobile terminal are control channel elements of a subset of the group of control channel elements.

An example of such technique is given in reference to the FIG. 4.

The FIG. 4 depicts the different operations executed by a base station and a mobile terminal on control channel elements according to prior art.

The operation shown in lines 40 to 42 are executed by the base station and the operation shown in lines 43 and 44 by the mobile terminal.

The line 40 shows the coded and modulated information combined with CRC intended to be mapped on in the control channel elements.

The line 41 shows examples of identifiers of the destination mobile terminals.

The line 42 shows the result of the masking, by the base station, of the data formed by the coded and modulated information combined with CRC by the identifier of the destination mobile terminal using a Boolean exclusive OR. The masked data are mapped on the control channel elements.

The line 43 shows the mask used by a mobile terminal noted UE2 for masking the data mapped on the control channel elements.

The line 44 shows the result of the masking, by the mobile terminal noted UE2, of the data mapped on the control channel elements by the identifier of the mobile terminal using a Boolean exclusive OR.

The column 45a shows the operation executed by the base station for a first control channel element allocated to a mobile terminal noted UE1 and the column 45b shows the operation executed by the base station for a second control channel element allocated to the mobile terminal UE1.

The column 46a shows the operation executed by the base station for a third control channel element allocated to the mobile terminal UE2 and the column 46b shows the operation executed by the base station for a fourth control channel element allocated to the mobile terminal UE2.

It has to be noted here that, in the example of the FIG. 4, the control channel elements are on consecutive resources but, according to the present invention, the control channel elements are not necessary consecutive resources.

The cells 47a, 47b, 48a and 48b show the result of the masking, executed by the mobile terminal UE2, of the respective masked data formed by the coded and modulated information combined with CRC which are mapped on the received control channel elements allocated for the mobile terminals UE1 and UE2.

The example of the FIG. 4 uses only coded and modulated information combined with CRC having a length of three bits for the sake of simplicity but we can understand that coded and modulated information combined with CRC used in practice is represented by a larger number of bits.

According to the example of the FIG. 4, the base station intends to map on the first control channel element allocated to the mobile terminal UE1, the coded and modulated information combined with CRC '001', masks it by the identifier of the mobile terminal UE1 '001' and obtains the value '000' which is mapped on the first control channel element allocated to the mobile terminal UE1.

The base station intends to map on the second control channel element allocated to the mobile terminal UE1, the duplicated coded and modulated information combined with CRC '001', masks it by the identifier of the mobile terminal UE1 '001' and obtains the value '000' which is mapped on the second control channel element allocated to the mobile terminal UE1.

The base station intends to map on the third control channel element allocated to the mobile terminal UE2, the coded and modulated information combined with CRC '010', masks it by the identifier of the mobile terminal UE1 '011' and obtains the value '001' which is mapped on the third control channel element allocated to the mobile terminal UE2.

The base station intends to map on the fourth control channel element allocated to the mobile terminal UE2, the duplicated coded and modulated information combined with CRC '010', masks it by the identifier of the mobile terminal UE1 '011' and obtains the value '001' which is mapped on the fourth control channel element allocated to the mobile terminal UE2.

Each mobile terminal receives all the control channel elements. The mobile terminal UE2 receives the data mapped on the control channel elements and masks each data mapped on the control channel element by its identifier '011'.

The result of the masking of the data mapped on the first control channel element allocated to the mobile terminal UE1 is equal to '011' as shown in the cell 47a, the result of the masking of the data mapped on the second control channel element allocated to the mobile terminal UE1 is equal to '011' as shown in the cell 47b, the result of the masking of the data mapped on the third control channel element allocated to the mobile terminal UE2 is equal to '010' as shown in the cell 48a and the result of the masking of the data mapped on the fourth control channel element allocated to the mobile terminal UE2 is equal to '010' as shown in the cell 48b.

The results shown in the line 44 demonstrate that the mobile terminal UE2 can not determine immediately that two consecutive control channel elements are allocated to it, as the values comprised in the cells 47a and 47b are identical like the values comprised in the cells 48a and 48b. In order to determine the number of control channel elements which have been allocated to it, the mobile terminal UE2 performs a demodulation, a decoding of the coded and modulated information combined with CRC and executes a CRC check on the information in order to confirm or not if the results comprised in the cells 47a, 47b, 48a and 48b are identical to the values comprised in the lines 40.

As the CRC check for the cell 47a fails, a wrong mask has been applied, i.e. the first control channel element is not allocated to the mobile terminal UE2.

As the CRC check for the cell 47b fails, a wrong mask has been applied, i.e. the control channel element is not allocated to the mobile terminal UE2.

As the CRC check for the cell 48a is successful, the right mask has been applied, i.e. the control channel element is allocated to the mobile terminal UE2.

As the CRC check for the cell 48b is successful, the right mask has been applied, i.e. two control channel elements are allocated to the mobile terminal UE2.

As it has been shown, each mobile terminal needs to apply a mask on each control channel element and to proceed to a demodulation, a decoding of the coded and modulated information combined with CRC and to perform a CRC check for each control channel element.

Such process needs high processing capabilities for the mobile terminals and increases the cost of the mobile terminals.

The aim of the invention is therefore to propose a method and a device which make it possible to avoid to proceed, for each control channel element, to a demodulation, a decoding of the coded and modulated information combined with CRC and to perform a CRC check.

To that end, the present invention concerns a method for allocating, by a telecommunication device, at least a first and a second channel elements of a group of channel elements of a channel resource to a destination, each channel element being a predefined subdivision of the channel resource, characterised in that the method comprises the steps executed by the telecommunication device of:

selecting, for the first channel element, a first randomisation function according to the position of the first channel element within the group of channel elements and according to the destination, selecting, for the second channel element, a second randomisation function according to the position of the second channel element within the group of channel elements and according to the destination, processing the data to be included in the first channel element by the first randomisation function and processing the data to be included in the first channel element by the second randomisation function, transferring the data processed by the first randomisation function by mapping the data processed by the first randomisation function on the first channel element and the data processed by the second randomisation function by mapping the data processed by the second randomisation function on the second channel element in combination with other data processed by other randomisation functions mapped on other channel elements of the channel resource.

The present invention concerns also a device for allocating at least a first and a second channel elements of a group of channel elements of a channel resource to a destination, each channel element being a predefined subdivision of the channel resource, characterised in that the device for allocating is included in a telecommunication device, and comprises:

means for selecting, for the first channel element a first randomisation function according to the position of the first channel element within the group of channel elements and according to the destination, means for selecting, for the second channel element a second randomisation function according to the position of the second channel element within the group of channel elements and according to the destination, means for processing the data to be included in the first channel element by the first randomisation function and processing the data to be included in the first channel element by the second randomisation function, means for transferring the data processed by the first randomisation function by mapping the data processed by the first randomisation function on the first channel element and the data processed by the second randomisation function by mapping the data processed by the second randomisation function on the second channel element in combination with other data processed by other randomisation functions mapped on other channel elements of the channel resource.

Thus, by using different randomisation functions allocated to a destination instead of using the same randomisation function, the destination can determine immediately that at least two channel elements are allocated to it without having to perform, for each channel element, a demodulation and a decoding of the coded and modulated information combined with CRC and to perform a CRC check on the information.

According to a particular feature, the randomisation functions are scrambling sequences and the processes of the data are multiplications.

According to a particular feature, the randomisation functions are interleaving functions and the processes of the data are permutations.

According to a particular feature, the allocation is executed for at least two destinations.

According to a particular feature, the data are formed by modulating and coding information combined with a cyclic redundancy of the information.

Thus, by using different randomisation functions allocated to different destinations, each destination can determine immediately that at least two consecutive channel elements are allocated to it without having to perform, for each channel element, a demodulation and a decoding of the coded and modulated information combined with CRC and to perform a CRC check on the information.

According to a particular feature, the destination is another telecommunication device or an application executed by the other telecommunication device.

Thus, it is possible, for the other telecommunication device to identify for which application or applications the channel elements are allocated to without having to perform a demodulation and a decoding of the coded and modulated information in order to retrieve, within the information, information identifying the application or applications the channel elements are allocated to.

According to a particular feature, the channel elements are control channel elements and the data are representative of a modulation and/or a coding scheme to be used by the destination for a subset of the group of channel elements and/or a location of a subset of the group of channel elements and/or a space time code to be used by the destination for a subset of the group of channel elements.

According to a particular feature, the at least first and the second channel elements are consecutive channel elements in the group of channel elements.

The present invention concerns also a method for determining if at least a first and a second channel elements of a group of channel elements of a channel resource are allocated to a destination by a first telecommunication device, each channel element being a predefined subdivision of the channel resource, characterised in that the method comprises the steps executed by the destination of:

receiving a group of channel elements on which received data are mapped, selecting, for each channel element, a randomisation function according to the position of the channel element in the group of channel elements, processing the received data mapped on each channel element by the randomisation function determined for the channel element on which the received data are mapped, determining, among the processed received data, at least two identical processed received data obtained from the received data mapped on at least two channel elements of a subset of the group of channel elements, deciding that the at least two channel elements of the subset of the group of channel elements are allocated to the destination if the at least two processed received data are identical.

The present invention concerns also a device for determining if at least a first and a second channel elements of a group of channel elements of a channel resource are allocated to a destination by a first telecommunication device, each channel element being a predefined subdivision of the channel resource, characterised in that the device for determining is included in a second telecommunication device and comprises:

means for receiving a group of channel elements on which received data have been mapped, means for selecting, for each channel element, a randomisation function according to the position of the channel element within the group of channel elements, means for processing the received data mapped on each channel element by the randomisation function determined for the channel element on which the received data are mapped, means for determining, among the processed received data, at least two identical processed received data obtained from received data mapped on at least two channel elements of a subset of the group of channel elements, means for deciding that the at least two channel elements of the subset of the group of channel elements are allocated to the destination if the at least two processed received data are identical.

Thus, by using different randomisation functions, the destination can determine immediately that at least two channel elements are allocated to it without having to perform, for each channel element, a demodulation and a decoding of the coded and modulated information combined with CRC and to perform a CRC check on the information.

Furthermore, as the randomisation functions are determined according to the position of a channel elements in the group of channel elements, the retrieval of the randomisation functions to be used is simple to implement.

According to a particular feature, the randomisation functions are de-scrambling sequences and the processes of the data are multiplications.

According to a particular feature, the randomisation functions are de-interleaving functions and the processes of the data are permutations.

According to a particular feature, the processed received data corresponding to the received data mapped on each channel element are under the form of T consecutive modulation symbols, and the determination is obtained by:

selecting each possible subset of the group of channel elements, each subset comprising at least two channel elements, and for each possible subset of the group of channel elements:

dividing the subset into a first part comprising a channel element or elements and a second part comprising β channel element or elements, wherein α+β=L L being the number of channel elements comprised in the subset, determining an accumulation for the α channel element or elements of the first part by executing T accumulations of the α symbol or symbols having the same position, determining an accumulation for the β channel element or elements of the second part by executing T accumulations of the β symbol or symbols having the same position, processing the results of the accumulations executed on the first and second parts, obtaining a normalized value from the result of the process of the results, selecting the highest normalized value, comparing the highest normalized value to a threshold.

The inventors of the present invention have found that by dividing the consecutive positions into a first and a second parts, and executing accumulations respectively on each part, the results are improved.

According to a particular feature, the processing of the accumulations executed on the first and second parts is an accumulation of accumulations executed on the first and second parts.

According to a particular feature, the processing of the accumulations executed on the first and second parts is a correlation of the accumulations executed on the first part and on the second part.

The correlation is used for discriminating the destination by localizing the repetition patterns. If repetition is performed on more than two channel elements, more than one peak is obtained, it is better to take advantage of it by accumulating the signals received on the allocated channel elements. The accumulation aims at enhancing the signal to noise ratio and improving the decoding performance. It also results in a single power peak.

The proposed solution is then a compromise between the discrimination by correlation and the signal to noise ratio improvement by accumulation.

According to a particular feature, α=β=L/2 or α=(L−1)/2 and β=(L+1)/2.

The inventors of the present invention have found that by selecting α=β=L/2 or α=(L−1)/2 and β=(L+1)/2, the performances are improved.

According to a particular feature, if the highest normalized value is higher than the threshold, the decision is obtained by:

ordering the normalized values, selecting at least a part of the highest normalized values, and as far as the decision is not obtained, from the highest to the lowest selected normalized value:

determining, for the subset from which the normalized value is obtained, an accumulation for the L channel elements by executing T accumulations of the L symbols having the same position, demodulating the results of the accumulations of the L symbols, decoding bits resulting from the demodulation in order to obtain information combined with a cyclic redundancy of the information, checking the cyclic redundancy, deciding that the L channel elements of the subset from which the normalized value is obtained are allocated to the destination if the redundancy check is correct.

Thus, by ordering the normalized values, by selecting at least a part of the highest normalized values and executing the present invention from the highest value to the lowest one, the decision can be taken rapidly.

According to a particular feature, if no redundancy check is correct for each of the selected values, the method comprises further steps of:

as far as a decision that one channel element within the group of channel elements is allocated to the destination is not obtained:

selecting a channel element of the group of channel elements on which received data are mapped, demodulating the received data mapped on the selected channel element, decoding bits resulting from the demodulation in order to obtain information combined with a cyclic redundancy of the information, checking the cyclic redundancy, deciding that the channel element is allocated to the destination if the cyclic redundancy check is correct.

Thus, by executing a process intending to decide if at least two channel elements are allocated to the application prior to execute a process intending to decide if one channel element is allocated to the application if the highest normalized value is higher than the threshold, the decision can be taken rapidly.

According to a particular feature, if no decision that one channel element within the group of channel elements is allocated to the destination is obtained, the method comprises further steps of:

selecting at least a part of the normalized values which do not belong to the part of the highest normalized values, and as far as the decision is not obtained, from the highest to lowest selected normalized values of the part of the normalized values which do not belong to the part of the highest normalized values:

determining, for the subset from which the normalized value is obtained, an accumulation for the L channel elements by executing T accumulations of the L symbols having the same position, demodulating the results of the accumulations of the L symbols, decoding bits resulting from the demodulation in order to obtain information combined with a cyclic redundancy of the information, checking the cyclic redundancy, deciding that the L channel elements of the subset from which the normalized value is obtained are allocated to the destination if the redundancy check is correct.

Thus, a large number of possible cases are considered in an efficient way.

According to a particular feature, if the highest normalized value is lower than the threshold, the decision is obtained by:

as far as a decision that one channel element within the group of channel elements is allocated to the destination is not obtained:

selecting a channel element of the group of channel elements on which received data are mapped, demodulating the received data mapped on the selected channel element, decoding bits resulting from the demodulation in order to obtain information combined with a cyclic redundancy of the information, checking the cyclic redundancy, deciding that the channel element is allocated to the destination if the cyclic redundancy check is correct.

Thus, the decision can be taken rapidly.

According to a particular feature, if no decision that one channel element within the group of channel elements is allocated to the destination is obtained, the decision is obtained by:
  ordering the normalized values,
  selecting at least a part of the highest normalized values,
  and as far as the decision is not obtained, from the highest to the lowest selected normalized values:
    determining, for the subset from which the normalized value is obtained, an accumulation for the L channel elements by executing T accumulations of the L symbols having the same position,
    demodulating the results of the accumulation of the L symbols,
    decoding bits resulting from the demodulation in order to obtain information combined with a cyclic redundancy of the information,
    checking the cyclic redundancy,
    deciding if the redundancy check is correct, that the L channel elements of the subset from which the information and the cyclic redundancy are obtained, are allocated to the destination.

Thus, by executing a process intending to decide if one channel element is allocated to the application or executing a process intending to decide if at least two channel elements are allocated to the application if the highest normalized value is lower than the threshold, the decision can be taken rapidly.

According to a particular feature, the processed received data corresponding to the received data mapped on each channel element are under the form of T consecutive modulation symbols and the determination and the decision are obtained by:
  selecting a first possible subset of the group of channel elements, the first possible subset comprising at least two channel elements,
    dividing the first possible subset into a first part comprising α channel element or elements and a second part comprising β channel element or elements, wherein α+β=L, L being the number of channel elements comprised in the first possible subset,
    determining an accumulation for the α channel element or elements of the first part of the first possible subset by executing T accumulations of the α symbol or symbols having the same position,
    determining an accumulation for the β channel element or elements of the second part of the first possible subset by executing T accumulations of the β symbol or symbols having the same position,
  processing the results of the accumulations executed on the first and second parts of the first possible subset,
  obtaining a first normalized value from the result of the process of the results,
  selecting a second possible subset of the group of channel elements, the second possible subset comprising at least two channel elements,
    dividing the second possible subset into a first part comprising α' channel element or elements and a second part comprising β' channel element or elements, wherein α'+β'=L', L' being the number of channel elements comprised in the second possible subset,
    determining an accumulation for the α' channel element or elements of the first part of the second possible subset by executing T accumulations of the α' symbol or symbols having the same position,
    determining an accumulation for the β' channel element or elements of the second part of the second possible subset by executing T accumulations of the β' symbol or symbols having the same position,
  processing the results of the accumulations executed on the first and second parts of the second possible subset,
  obtaining a second normalized value from the result of the process of the results,
  checking if the second normalized value is higher than a threshold,
  checking if the second normalized value is lower than the first normalized value,
  and if the second normalized value is lower than the first normalized value and higher than the threshold:
    demodulating the result of the accumulation executed on the first and second parts of the first subset,
    decoding bits resulting from the demodulation in order to obtain information combined with a cyclic redundancy of the information,
    checking the cyclic redundancy,
    deciding if the redundancy check is correct, that the L channel elements of the first subset are allocated to the destination.

According to a particular feature, $\alpha=\beta=L/2$ and $\alpha'=\beta'=L/2$ or $\alpha=(L-1)/2$ and $\beta=(L+1)/2$ and $\alpha'=(L'-1)/2$ and $\beta'=(L'+1)/2$.

According to a particular feature, the at least first and the second channel elements are consecutive channel elements in the group of channel elements.

According to still another aspect, the present invention concerns computer programs which can be directly loadable into a programmable device, comprising instructions or portions of code for implementing the steps of the methods according to the invention, when said computer programs are executed on a programmable device.

Since the features and advantages related to the computer programs are the same as those set out above related to the method and device according to the invention, they will not be repeated here.

The characteristics of the invention will emerge more clearly from a reading of the following description of an example of embodiment, the said description being produced with reference to the accompanying drawings, among which:

FIG. 4 depicts the different operations executed by a base station and a mobile terminal on control channel elements according to prior art.

FIG. 5 depicts the different operations executed by a first and a second telecommunication devices for control channel elements according to the present invention;

FIG. 8 depicts subsets of the group of control channel elements in an example wherein the group of control channel elements comprises six control channel elements;

FIG. 9 depicts an example of symbols comprised in each control channel element of the group of control channel elements in an example wherein the control channel comprises six control channel elements;

FIG. 10 discloses an example of parts of scrambling sequences determined for scrambling the control channels elements according to the present invention.

Figure 1:
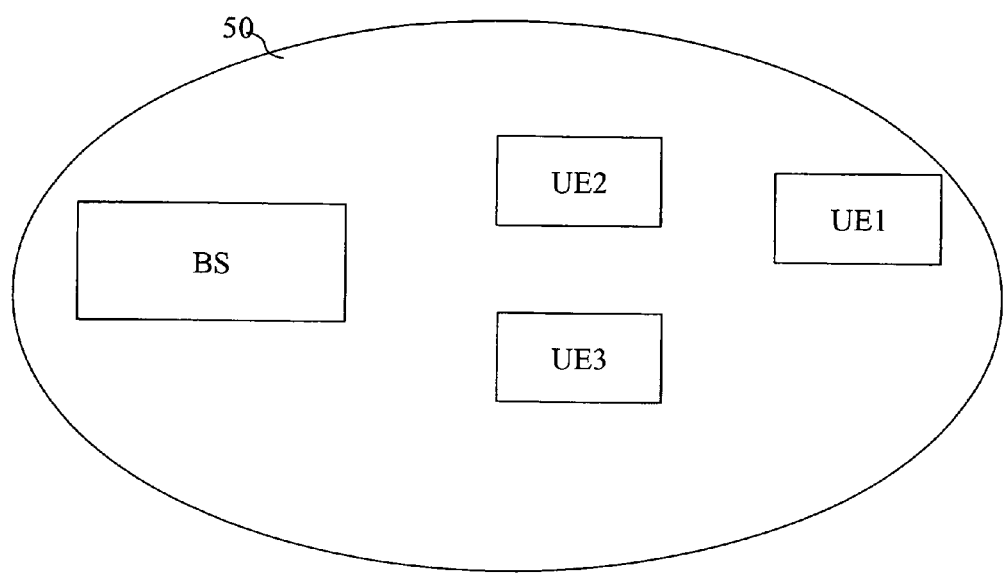
FIG. 1 is a diagram representing the architecture of a telecommunication network according to the present invention.

FIG. 1 is a diagram representing the architecture of a telecommunication network according to the present invention.

The present invention will be described in a wireless network like a wireless cellular network or a local area network but the present invention is also applicable to wired networks like power line networks.

Only one coverage area 50 of a first telecommunication device BS is shown in the FIG. 1 for the sake of simplicity but in practice, and especially when the wireless network is a wireless cellular network, the wireless cellular telecommunication network is composed of a more important number of first telecommunication devices BS and coverage areas 50.

In the telecommunication network of the FIG. 1, at least one and preferably plural second telecommunication devices UE1, UE2 and UE3 are comprised in a coverage area 50 of the first telecommunication device BS.

Only three second telecommunication devices UE are shown in the FIG. 1 for the sake of simplicity but in practice, a more important number of second telecommunication devices UE are in the coverage area 50 of the first telecommunication device BS.

The first telecommunication device BS is a base station BS or a node B or a node or an enhanced node B or an access point.

The second telecommunication devices UE are as example mobile phones, personal digital assistants or personal computers or computer peripheral devices.

According to the example of the FIG. 1, the first telecommunication device BS intends to communicate with at least one second telecommunication device UEi with i=1 to 3. For that, the first telecommunication device BS allocates parts of the telecommunication network channel resource to the second telecommunication devices UE.

As disclosed in the prior art, the first telecommunication device BS needs to indicate to each second telecommunication device UE which channel element or elements is or are allocated to the second telecommunication device UE for downlink and/or uplink transmission.

For that, the first telecommunication device BS uses the group of control channel elements which is composed of control channel elements.

One or plural control channel elements are allocated to a given second telecommunication device UE, as example according to the distance separating the first telecommunication device BS and the second telecommunication device UE or according to the attenuation or interference which exist in the communication link between the first telecommunication device BS and the second telecommunication device UE or according to the amount of data to be transferred. When plural control channel elements are allocated to a given second telecommunication device UE, these control channel elements are consecutive or not.

The channel elements or control channel elements allocated to a second telecommunication device UE are channel elements or control channel elements or a subset of the group of channel elements or of the group of control channel elements.

According to the invention, in order to enable each second telecommunication device UE to recover both its allocated channel element or elements and data through the group of control channel elements, the first telecommunication device UE processes the data formed by coded and modulated information combined with a CRC of the information and maps the processed data on a control channel element, the data being processed by a randomisation function determined according to the destination to which the control channel element is allocated and the position of the control channel element in the group of control channel elements.

The randomisation functions are scrambling sequences or interleaving functions aiming at breaking the repetition structure of the data.

When a randomisation function is a scrambling sequence, the process of data is a multiplication of the data by the scrambling sequence.

When a randomisation function is an interleaving function, the process of data is a permutation of the data by the interleaving function.

Any other technique breaking the repetition structure of the data can be used in the present invention.

The destination to which channel element or elements or control channel element or elements is or are allocated is a second telecommunication device or more precisely an application executed on a second telecommunication device UE. An application is either an application which manages the reception of data through the downlink channel or an application which manages the transfer of data through the uplink channel or any other application like the reception and/or the transfer of particular data like data related to video application or voice application.

When the application is an application which manages the reception of data through the downlink channel, the allocated control channel element or elements grants or grant the reception of data through the downlink channel by the second telecommunication device UE which executes the application which manages the reception of data through the downlink channel.

When the application is an application which manages the reception of data through the downlink channel, the allocated channel element or elements grants or grant the reception of data through the downlink channel on the allocated channel element or elements by the second telecommunication device UE which executes the application which manages the reception of data through the downlink channel.

When the application is an application which manages the transfer of data through the uplink channel, the allocated control channel element or elements grants or grant the transfer of data through the uplink channel by the second telecommunication device UE which executes the application which manages the transfer of data through the uplink channel.

When the application is an application which manages the transfer of data through the uplink channel, the allocated channel element or elements grants or grant the transfer of data through the uplink channel on the allocated channel element or elements by the second telecommunication device UE which executes the application which manages the transfer of data through the uplink channel.

Preferably and in a non limitative way, when the randomisation function is a scrambling sequence, the scrambling sequence is a part of an identifier of the second telecommunication device UE to which the control channel element is allocated. The part of the identifier is determined among plural parts of the identifier of the second telecommunication device UE according to the position of the control channel element in the group of control channel elements.

Preferably and in a non limitative way, when the randomisation functions are interleaving functions, the interleaving functions are derived from the identifier of the second telecommunication device UE to which the control channel element is allocated. Each of the interleaving functions is different from the other interleaving functions.

An identifier of a second telecommunication device UE is an information which uniquely identifies the second telecommunication device UE among the other second telecommunication devices UE comprised in the coverage area 50 of the first telecommunication device BS or is an information which uniquely identifies the second telecommunication device UE among the other second telecommunication devices UE comprised in at least a part of the telecommunication network.

A second telecommunication device UE may have more than one identifier. As example, an identifier may be used for indicating to a second telecommunication device UE which channel element or elements is or are allocated to the second telecommunication device UE for downlink transmission and another identifier may be used for indicating to the second telecommunication device UE which channel element or elements is or are allocated to the second telecommunication device UE for uplink transmission.

According to another example, different identifiers are used for indicating to different applications executed on the second telecommunication device UE which channel element or elements is or are allocated respectively to the applications.

An example of such determination is given in reference to the FIG. 10.

The FIG. 10 discloses an example of parts of scrambling sequences determined for scrambling the control channel elements according to the present invention.

For the sake of simplicity, the example of the FIG. 10 discloses an example wherein the second telecommunication devices UE have a single identifier.

The line 100 represents the group of control channel elements which is composed of six control channel elements CCE1 to CCE6. Only six control channel elements are shown for the sake of simplicity but in practice, the group of control channel elements is composed of a more important number of control channel elements.

The line 101 represents the identifier of the second telecommunication device UE1, the line 102 represents the identifier of the second telecommunication device UE2 and the line 103 represents the identifier of the second telecommunication device UE3. Each identifier is different from the other identifiers. According to the invention, each identifier is divided into N scrambling sequences, where N is at least equal to the number of control channel elements of the group of control channel elements. Each scrambling sequence is different from the other scrambling sequences.

It has to be noted here that the scrambling sequence can be determined from classical code allocation method and especially from code allocation methods which warrant the maximal distance between codes.

A (2T, NUEID+NCEindex, Dhmin) linear code is used, i.e. with an input length NUEID+NCEindex and output length of 2T, where T is the number of modulation symbols for a control channel element or in other words, is the number of resource elements per control channel element. The minimum Hamming distance of the code is Dhmin. The 2T bits can be used directly in case of a QPSK modulation using a Boolean exclusive OR mask, or the 2T bits can be used for forming T complex symbols in case of any modulation. The T complex symbols are under the form of $(2c_{2i}-1)+j(2c_{2i+1}-1)$, where $c_x$ is the value of the bit at the position x. $2^{NUEID}$ is the total number of identifiers of the second telecommunication devices UE and NCEindex is the number of scrambling sequences per identifier.

The NCEindex bits allow to change the scrambling sequence of a given second telecommunication device from a control channel element to another and is equal to the closest integer higher or equal to $\log_2(N)$, where N is the number of control channel elements of the group of control channel elements.

If two second telecommunication devices UE have distinct identifiers and the same value of the coded information combined with CRC, their scrambling sequences are separated by at least a Hamming distance of Dhmin bits.

If the linear code is convolutional or cyclic, the first telecommunication device BS does not need to generate all the N scrambling sequences of all the second telecommunication devices UE. The first telecommunication device BS generates the scrambling sequences according to the instantaneous resource allocation scheme, by correctly setting the NCEindex plus NUEID bits at the input of the linear code in order to obtain 2T bits for scrambling at the output of the code. Each second telecommunication device UE can either store its own scrambling sequences or generated them on the fly.

As example, if NUEID is equal to 16, NCEindex is equal to 6 and T is equal to 35, the code needs to have a rate of 22 over 70.

A convolutional code having a constraint length of 14 for 22 input bits provides (22+13)*2=70 output bits and Dhmin is equal to 16.

A convolutional code having a constraint length of 3 for 22 input bits provides (22+2)*3=72 output bits and Dhmin is equal to 8.

In another example, an algebraic geometric code, otherwise known as a Goppa code which is a specific block code, with a rate of 19 over 69 provides a Hamming distance of 21 bits.

According to the example of the FIG. 10, the identifier of the second telecommunication device UE1 is divided into six scrambling sequences SC11 to SC16, the identifier of the second telecommunication device UE2 is divided into six scrambling sequences SC21 to SC26 and the identifier of the second telecommunication device UE3 is divided into six scrambling sequences SC31 to SC36.

The scrambling sequences SC11, SC21 and SC31 can be used for scrambling data formed by the coded and modulated information combined with CRC. The scrambled data are mapped on the first control channel element CCE1. The scrambling sequences SC12, SC22 and SC32 can be used for scrambling the data formed by the coded and modulated information combined with CRC. The scrambled data are mapped on the second control channel element CCE2. The scrambling sequences SC13, SC23 and SC33 can be used for scrambling the data formed by the coded and modulated information combined with CRC. The scrambled data are mapped on the third control channel element CCE3. The scrambling sequences SC14, SC24 and SC34 can be used for scrambling the data formed by the coded and modulated information combined with CRC. The scrambled data are mapped on the fourth control channel element CCE4. The scrambling sequences SC15, SC25 and SC35 can be used for scrambling the data formed by the coded and modulated information combined with CRC. The scrambled data are mapped on the fifth control channel element CCE5. The scrambling sequences SC16, SC26 and SC36 can be used for scrambling the data formed by the coded and modulated information combined with CRC. The scrambled data are mapped on the sixth control channel element CCE6.

The line 104 discloses an example of parts of scrambling sequences determined for scrambling the data mapped on the control channel elements.

The first telecommunication device BS allocates the first and second control channel elements CCE1 and CCE2 to the second telecommunication device UE1 and the third to the sixth control channel elements CCE3 to CCE6 to the second telecommunication device UE2. The first telecommunication device BS scrambles the data formed by the coded and modulated information combined with CRC by the scrambling sequence SC11 and maps the coded data on the control channel element CCE1. The first telecommunication device BS scrambles the data formed by the coded and modulated information combined with CRC by the scrambling sequence SC12 and maps the scrambled data on the control channel element CCE2. The first telecommunication device BS scrambles the data formed by the coded and modulated information combined with CRC by the scrambling sequence SC23 and maps the scrambled data on the control channel element CCE3. The first telecommunication device BS scrambles data formed by the coded and modulated information combined with CRC by the scrambling sequence SC24 and maps the scrambled data on the control channel element CCE4. The first telecommunication device BS scrambles data formed by the coded and modulated information combined with CRC by the scrambling sequence SC25 and maps the scrambled data on the control channel element CCE5. The first telecommunication device BS scrambles the data formed by the coded and modulated information combined with CRC by the scrambling sequence SC26 and maps the scrambled data on the control channel element CCE6.

It has to be noted here that in a variant of realisation, the scrambling sequences are not defined according to the identifier of the second telecommunication devices UE.

The FIG. 10 discloses an example wherein randomisation functions are scrambling sequences which are determined for multiplying the data mapped on the control channel elements according to the present invention. A similar determination is made when randomisation functions are interleaving functions which are determined for permuting the data mapped on the control channel elements according to the present invention.

Each second telecommunication device UE has to recover both its allocated subset of channel elements and data through the control channel elements. More precisely, each second telecommunication device UE has to know the number of control channel elements which have been allocated to it and which control channel elements have been allocated to it.

An example of such a technique is given in reference to the FIG. 5.

The FIG. 5 depicts the different operations executed by a first and a second telecommunication devices for control channel elements according to the present invention.

The FIG. 5 discloses the different operations executed when the randomisation functions are scrambling sequences.

The operations shown in lines 50 to 51 are executed by the first telecommunication device BS and the operations shown in lines 53 and 54 by the second telecommunication device UE2.

The line 50 shows data formed by coded and modulated information combined with CRC. The data are mapped on the control channel elements which are identical to the one of the line 40 of the FIG. 4.

The line 51 shows examples of scrambling sequences. It has to be noted here that different scrambling sequences are allocated to a given second telecommunication device UE. Each scrambling sequence is determined according to the position of the control channel element to be scrambled and according to the second telecommunication device UE to which the scrambling sequence is allocated.

When more than one identifier is allocated to a second telecommunication device, each scrambling sequence is determined according to the position of the control channel element to be scrambled, according to the second telecommunication device UE to which the scrambling sequence is allocated and according to the destination application like uplink and/or downlink channel applications.

The line 52 shows the result of the scrambling by the first telecommunication device BS of the data formed by the coded and modulated information combined with CRC by a scrambling sequence determined as disclosed previously, as example using a mask and a Boolean exclusive OR. The scrambled data are mapped on the control channel elements.

The line 53 shows the de-scrambling sequence determined by the second telecommunication device UE2 for de-scrambling the data formed by the coded and modulated information combined with CRC.

The line 54 shows the result of the de-scrambling, by the second telecommunication device UE2, of the coded and modulated information combined with CRC by de-scrambling sequences, each de-scrambling sequence used for de-scrambling the data being determined from the position of the control channel element.

The column 55a shows the operation executed by the first telecommunication device BS for a first control channel element allocated to the second telecommunication device UE1 and the column 55b shows the operation executed by the first telecommunication device BS for a second control channel element allocated to the second telecommunication device UE1.

The column 56a shows the operation executed by the first telecommunication device BS for a third control channel element allocated to the second telecommunication device UE2 and the column 56b shows the operation executed by the first telecommunication device BS for a fourth control channel element allocated to the second telecommunication device UE2.

It has to be noted here that, according to the example of the FIG. 5, the control channel elements are consecutive but the control channel elements are not necessary consecutive in the present invention.

The cells 57a, 57b, 58a and 58b show the result of the masking executed by the second telecommunication device UE2 on the respective received data mapped on the control channel elements allocated to the second telecommunication devices UE1 and UE2.

The example of the FIG. 5 uses only coded and modulated information combined with CRC having a length of three bits for the sake of simplicity but we can understand that coded and modulated information combined with CRC, in practice, are represented by a larger number of bits.

The second telecommunication device UE1 has, as example, an identifier equal to the binary value "101110100111" and the second telecommunication device UE2 has, as example, an identifier equal to the binary value "000001010011".

The scrambling sequence for the first control channel element is equal to "101" if the first control channel element is allocated to the second telecommunication device UE1 or is equal to "000" if the first control channel element is allocated to the second telecommunication device UE2.

The scrambling sequence for the second control channel element is equal to "110" if the second control channel element is allocated to the second telecommunication device UE1 or is equal to "001" if the second control channel element is allocated to the second telecommunication device UE2.

The scrambling sequence for the third control channel element is equal to "100" if the third control channel element is allocated to the second telecommunication device UE1 or is equal to "010" if the third control channel element is allocated to the second telecommunication device UE2.

The scrambling sequence for the fourth control channel element is equal to "111" if the fourth control channel element is allocated to the second telecommunication device UE1 or is equal to "011" if the fourth control channel element is allocated to the second telecommunication device UE2.

According to the example of the FIG. 5, the first telecommunication device BS intends to map in the first control channel element allocated to the second telecommunication device UE1 the coded and modulated information combined with CRC '001', masks it by the scrambling sequence '101' and obtains the value '100' which is mapped on the first control channel element allocated to the second telecommunication device UE1.

The first telecommunication device BS intends to map on the second control channel element allocated to the second telecommunication device UE1 the duplicated coded and modulated information combined with CRC '001', masks it by the scrambling sequence '110' and obtains the value '111' which is mapped on the second control channel element allocated to the second telecommunication device UE1.

The first telecommunication device BS intends to map on the third control channel element allocated to the second telecommunication device UE2 the coded and modulated information combined with CRC '010', masks it by the scrambling sequence '010' and obtains the value '000' which is mapped on the third control channel element allocated to the second telecommunication device UE2.

The first telecommunication device BS intends to map on the fourth control channel element allocated to the second telecommunication device UE2 the duplicated coded and modulated information combined with CRC '010', masks it by the scrambling sequence '011' and obtains the value '001' which is mapped on the fourth control channel element allocated to the second telecommunication device UE2.

Each second telecommunication device receives all the data mapped on the control channel elements. The second telecommunication device UE2 masks the received data mapped on each control channel element by a respective de-scrambling sequence determined according to the position of the control channel element.

The result of the masking of the received data mapped on first control channel element is equal to '100' as shown in the cell 57a, the result of the masking of the received data mapped on the second control channel element is equal to '110' as shown in the cell 57b, the result of the masking of the received data mapped on the third control channel element is equal to '010' as shown in the cell 58a and the result of the masking of the received data mapped on the fourth control channel element is equal to '010' as shown in the cell 58b.

The second telecommunication device UE2 is able, according to results shown in the line 54, to determine that the binary "010" word has been repeated. Only the second telecommunication device UE2 can obtain, from the de-scrambling, the same value because the second telecommunication device UE2 uses the proper de-scrambling sequence. By using different de-scrambling sequences for each control channel element and as the number of bits used in practice is much larger than the one shown in the FIG. 5, the second telecommunication device UE2 doesn't obtain, for almost every case, identical results for consecutive control channel elements which have not been allocated to it. The second telecommunication device UE2 doesn't need to demodulate, decode and execute a CRC check on the results shown in the cell 57a and 57b.

For the remaining cases, a CRC check avoids that identical results for consecutive control channel elements which have not been allocated to it are understood as consecutive control channel elements which have been allocated to it.

Figure 2:
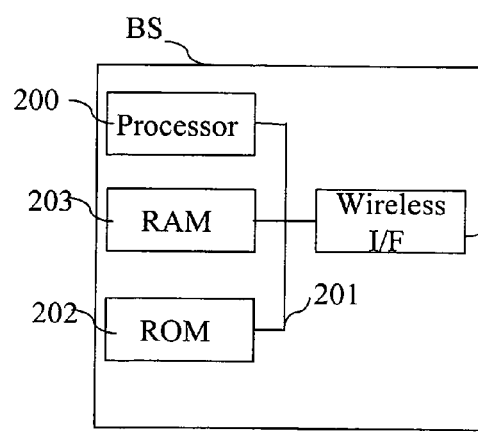
FIG. 2 is a block diagram of a first telecommunication device according to the present invention.

FIG. 2 is a block diagram of a first telecommunication device according to the present invention.

Figure 6:
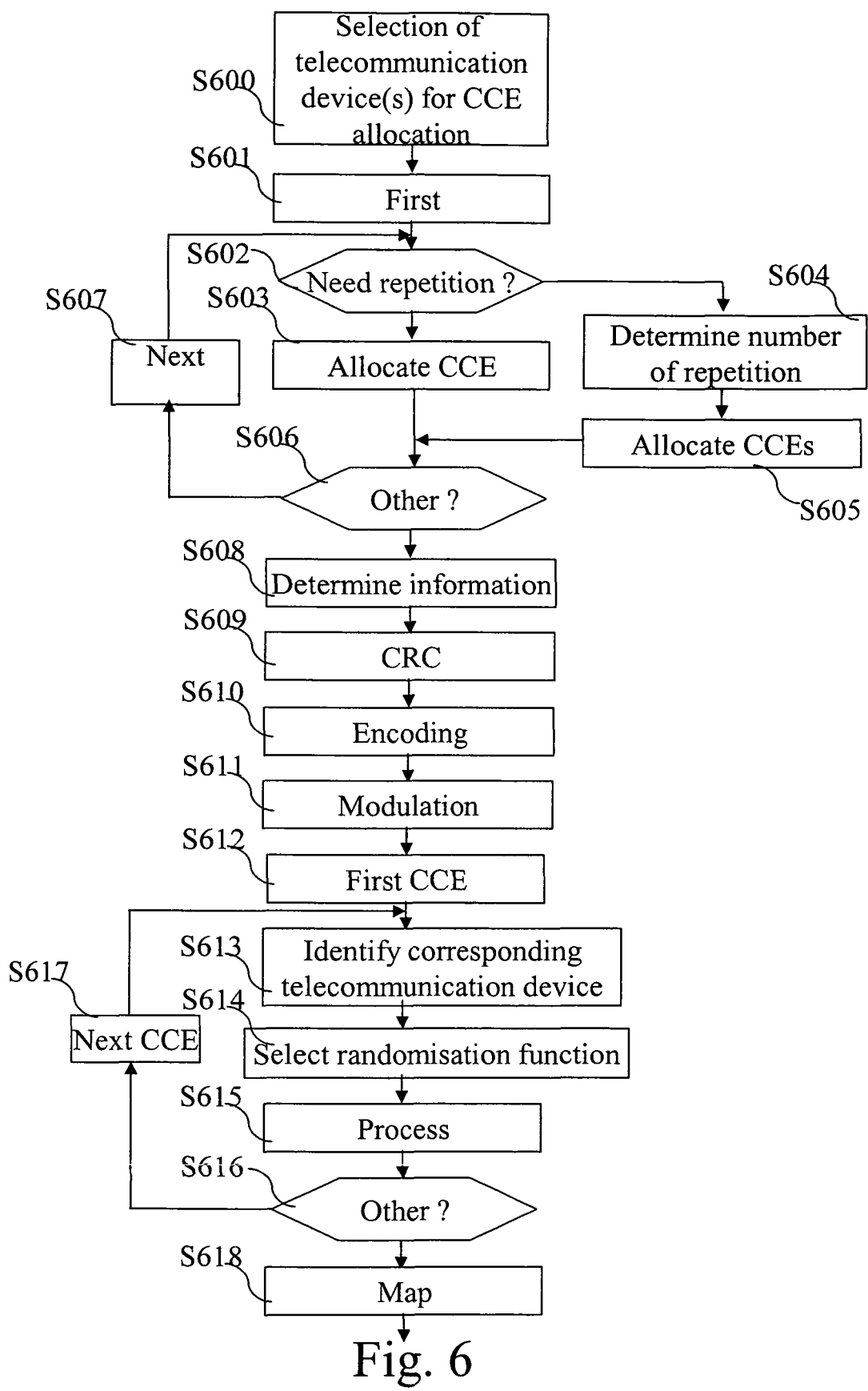
FIG. 6 depicts an algorithm executed by the first telecomunication device according to the present invention.

The first telecommunication device BS has, for example, an architecture based on components connected together by a bus 201 and a processor 200 controlled by the program related to the algorithm as disclosed in the FIG. 6.

It has to be noted here that the first telecommunication device BS is, in a variant, implemented under the form of one or several dedicated integrated circuits which execute the same operations as the one executed by the processor 200 as disclosed hereinafter.

The bus 201 links the processor 200 to a read only memory ROM 202, a random access memory RAM 203 and a channel interface 205.

The read only memory ROM 202 contains instructions of the programs related to the algorithm as disclosed in the FIG. 6 which are transferred, when the first telecommunication device BS is powered on to the random access memory RAM 203.

The RAM memory 203 contains registers intended to receive variables, and the instructions of the programs related to the algorithm as disclosed in the FIG. 6.

The processor 200 is able to determine a randomisation function according to the destination to which the control channel element is allocated and to the position of the control channel element in the group of control channel elements.

Figure 3:
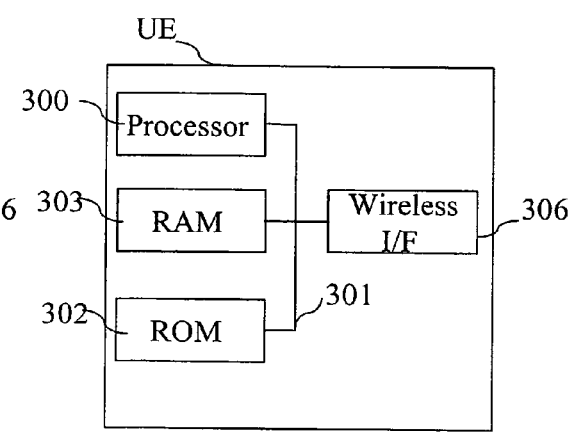
FIG. 3 is a block diagram of a second telecommunication device according to the present invention.

FIG. 3 is a block diagram of a second telecommunication device according to the present invention.

Each second telecommunication device UE has, for example, an architecture based on components connected together by a bus 301 and a processor 300 controlled by the program related to the algorithms as disclosed in the FIG. 7.

It has to be noted here that the second telecommunication devices UE are, in a variant, implemented under the form of one or several dedicated integrated circuits which execute the same operations as the one executed by the processor 300 as disclosed hereinafter.

The bus 301 links the processor 300 to a read only memory ROM 302, a random access memory RAM 303 and a channel interface 305.

The read only memory ROM 302 contains instructions of the programs related to the algorithms as disclosed in the FIG. 7 which are transferred, when the second telecommunication device UE is powered on to the random access memory RAM 303.

The RAM memory 303 contains registers intended to receive variables, and the instructions of the programs related to the algorithms as disclosed in the FIG. 7.

The processor 300 is able to determine, for each control channel element, a randomisation function according to the position of the control channel element in the group of control channel elements.

FIG. 6 depicts an algorithm executed by the first telecommunication device according to the present invention.

More precisely, the present algorithm is executed by the processor 200 of the first telecommunication device.

At step S600, the processor 200 selects at least one destination in order to allocate to it at least one control channel element (CCE). The or each destination is a second telecommunication device UE and/or at least one application executed by at least one second telecommunication device UE. As example, the processor 200 selects the second telecommunication devices UE1 and UE2.

At next step S601, the processor 200 selects a first destination. As example, the processor 200 selects the second telecommunication device UE1.

At next step S602, the processor 200 checks if the information comprised in the control channel element to be allocated to the selected destination need to be repeated. If the information comprised in the control channel element to be allocated to the destination need to be repeated, the processor 200 moves to step S604. Otherwise, the processor 200 moves to step S603.

According to the example of the FIG. 1, the second telecommunication device UE1 is far from the first telecommunication device BS, the processor 200 moves then to step S604.

At step S604, the processor 200 determines the number of times the information comprised in the control channel element to be allocated to the destination needs to be repeated.

At step S605, the processor 200 allocates the determined number of control channel elements to the selected destination.

After that, the processor 200 moves to step S606 and checks if all the destinations selected at step S600 have been processed. If all the destinations selected at step S600 have been processed, the processor 200 moves to step S608. Otherwise, the processor 200 moves to step S607.

At step S607, the processor 200 selects another destination and executes the loop constituted by the steps S602 to S606 as far as all the destinations selected at step S600 have been processed.

It has to be noted here that in a variant, the steps S604 and S600 are executed at the same time at the initial step of the present algorithm.

At step S608, the processor 200 determines information for each control channel element. The information are, as example, representative of the channel coding, like convolutional or turbo coding, the modulation scheme to be used by the second telecommunication device UE to which the control channel element is allocated.

At next step S609, the processor 200 calculates, for each information, a cyclic redundancy checksum (CRC) of the information.

At next step S610, the processor 200 commands the wireless interface 206 in order to encode each information combined with CRC and commands at step S611 the wireless interface 206 in order to modulate each encoded information combined with CRC.

At next step S612, the processor 200 selects the control channel element which is at the first position in the group of control channel elements.

At next step S613, the processor 200 identifies the second telecommunication device UE to which the selected control channel element is allocated.

At next step S614, the processor 200 selects the randomisation function to be applied on the data formed by the modulated and encoded information combined with CRC for the selected control channel element. The randomisation function, like a scrambling sequence or an interleaving function, is determined according to the destination identified at step S613 and the position of the control channel element in the group of control channel elements. Preferably and in a non limitative way, if the randomisation function is a scrambling sequence, the scrambling sequence is a part of the identifier of the destination. The destination is a second telecommunication device UE or an application executed by the second telecommunication device UE.

At next step S615, the processor 200 processes the modulated and encoded information combined with CRC by the selected randomisation function.

At next step S618, the processor 200 checks if all the control channel elements have been processed. If all the control channel elements have been processed, the processor 200 moves to step S618. Otherwise, the processor 200 moves to step S617 and selects the following control channel element in the group of control channel elements.

The processor 200 executes the loop constituted by the steps S613 to S617 as far as all the control channel elements have been processed.

At step S618, the processor 200 maps each processed data on the respective control channel elements which are then transferred.

It has to be noted here that, when a destination is an application executed by a given second telecommunication device UE, the processor 200 may select at least two applications executed by the same second telecommunication device UE.

Figure 7A:
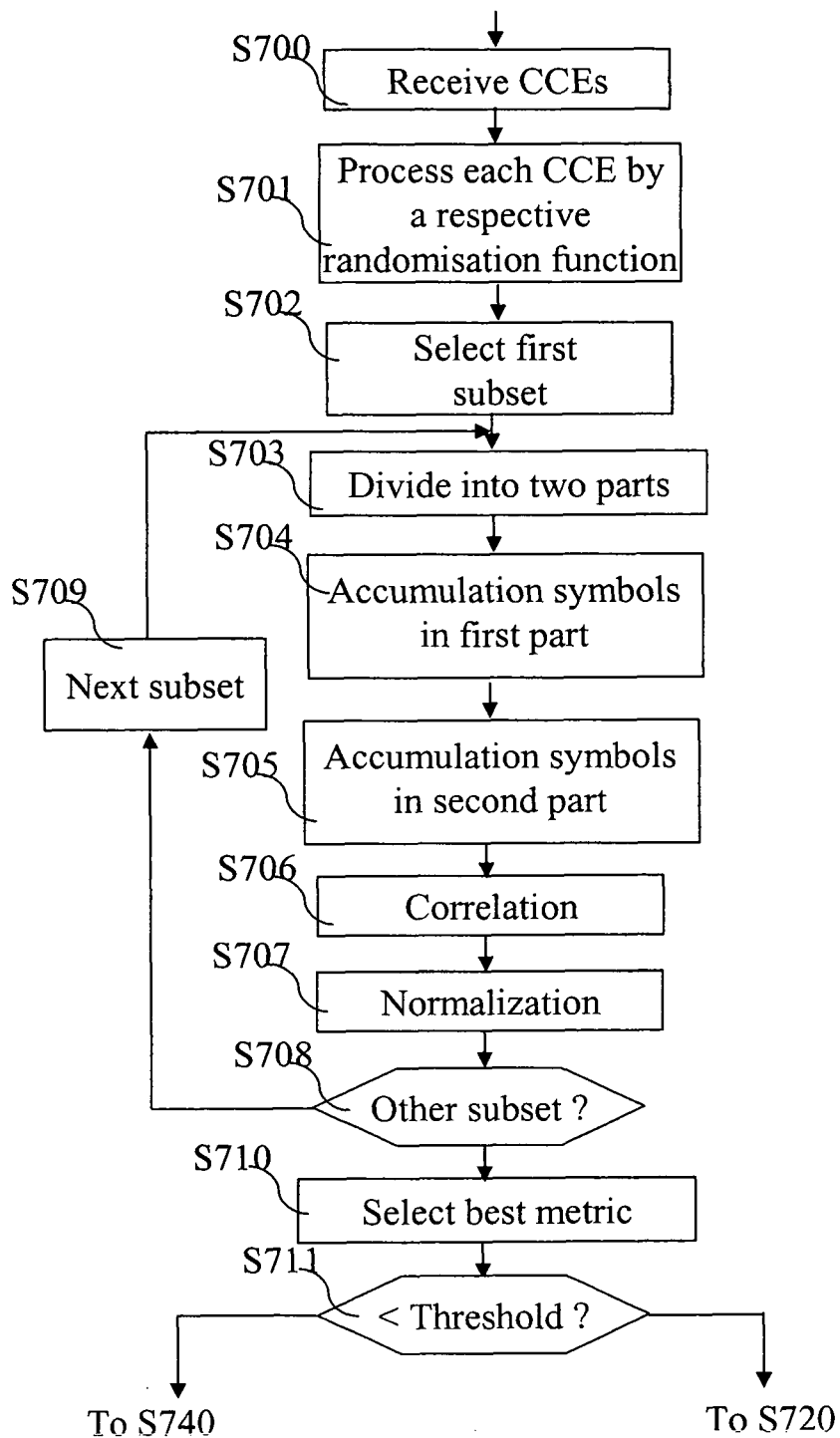
FIG. 7a depicts an algorithm executed by each second telecommunication device according to a first and a second modes of realisation of the present invention.

FIG. 7a depicts an algorithm executed by each second telecommunication device according to a first and a second modes of realisation of the present invention.

More precisely, the present algorithm is executed by the processor 300 of each second telecommunication device UE.

At step S700, the processor 300 is informed by the wireless interface 306, of the reception of the received data mapped on the control channel elements.

At next step S701, the processor 300 obtains for each control channel element, a randomisation function. The randomisation function is a de-scrambling sequence or a de-interleaving function. For each control channel element, the processor 300 reads into the RAM memory or the ROM memory the randomisation function which corresponds to the position of the control channel element in the group of control channel elements as it has been disclosed in reference to the FIG. 5. In a variant, the processor 300 computes on the fly the randomisation function which corresponds to the position of the control channel element in the group of control channel elements as it has been disclosed in reference to the FIG. 5.

When the second telecommunication device UE has plural identifiers, the processor 300 selects the randomisation function which corresponds to the position of the control channel element in the group of control channel elements for one identifier. At the same step, the processor 300 commands the wireless interface 306 in order to process the received data mapped on each control channel element by the randomisation function which corresponds to the position of the control channel element in the group of control channel elements.

At next step S702, the processor 300 selects a first subset. A subset comprises at least two control channel elements on which received data are mapped. Examples of subsets are given in the FIG. 8.

FIG. 8 depicts subsets of the group of control channel elements in an example wherein the group of control channel elements comprises six control channel elements.

The columns 800 to 804 comprise different possible subsets composed of two control channel elements. The column 800 comprises a subset composed of the control channel elements CCE1 and CCE2 marked by a cross in the column 800. The column 801 comprises another subset composed of the control channel elements CCE2 and CCE3 marked by a cross in the column 801, the column 802 comprises another subset composed of the control channel elements CCE3 and CCE4 marked by a cross in the column 802 and so on up to the column 804.

The columns 805 to 808 comprise different possible subsets composed of three control channel elements. The columns 809 to 811 comprise different possible subsets composed of four control channel elements. The columns 812 and 813 comprise different possible subsets composed of five control channel elements and the column 814 comprises a subset composed of six control channel elements.

At next step 5703, the processor 300 divides the selected subset into a first and a second parts. The first part comprises α control channel element or elements, the second part comprises β control channel element or elements and α+β=L wherein L is the total number of control channel elements of the selected subset.

Preferably, each part comprises L/2 channel elements if L is even or one part comprises (L−1)/2 control channel elements and the other part comprises (L+1)12 control channel elements if L is odd.

At next step S704, the processor 300 determines an accumulation for the α channel element or elements of the first part by executing T accumulations of the α symbol or symbols having the same position after the processing of the received data.

The accumulation aims at enhancing the signal to noise ratio and improving the decoding performance.

An example of the symbols comprised in each control channel element of the group of control channel elements is given in reference to the FIG. 9.

The FIG. 9 discloses an example of symbols comprised in each control channel element of the group of control channel elements in an example wherein the group of control channel elements comprises six control channel elements.

In the example of the FIG. 9, the group of control channel elements comprises six control channel elements CCE1 to CCE6. Each control channel element is composed of four symbols.

The symbols shown in the FIG. 9 are symbols after the processing of the received data. When the randomisation function is a de-interleaving function the symbols shown in the FIG. 9 have been de-interleaved.

The control channel element CCE2 is composed of the symbols $S_{1CCE2}$ to $S_{4CCE2}$, the control channel element CCE3 is composed of the symbols $S_{1CCE3}$ to $S_{4ccE3}$, the control channel element CCE4 is composed of the symbols $S_{1CCE4}$ to $S_{4CCE4}$ and the control channel element CCE5 is composed of the symbols $S_{1CCE5}$ to $S_{4CCE5}$.

The subset is composed of the control channel elements CCE2 to CCE5, the first part is composed of the control channel elements CCE2 and CCE3 and the second part is composed of the control channel elements CCE4 and CCE5.

According to the example of the FIG. 9, the processor 300 determines an accumulation for the control channel elements CCE2 and CCE3 by executing an accumulation of the first symbol $S_{1CCE2}$ of the control channel element CCE2 and of the first symbol $S_{1CCE3}$ of the control channel element CCE3, an accumulation of the second symbol $S_{2ccE2}$ of the control channel element CCE2 and of the second symbol $S_{2CCE3}$ of the control channel element CCE3, an accumulation of the third symbol $S_{3CCE2}$ of the control channel element CCE2 and of the third symbol $S_{3CCE3}$ of the control channel element CCE3 and an accumulation of the fourth symbol $S_{4CCE2}$ of the control channel element CCE2 and of the fourth symbol $S_{4CCE3}$ of the control channel element CCE3. As result, one vector having a dimension equal to the number of symbols of one control channel element, is obtained for each part.

At next step S705, the processor 300 determines an accumulation for the β channel element or elements of the second part by executing T accumulations of the β symbol or symbols having the same position after the processing of the received data.

According to the example of the FIG. 9, the processor 300 determines an accumulation for the control channel elements CCE4 and CCE5 by executing an accumulation of the first symbol $S_{1CCE4}$ of the control channel element CCE4 and of the first symbol $S_{1CCE5}$ of the control channel element CCE5, an accumulation of the second symbol $S_{2CCE4}$ of the control channel element CCE4 and of the second symbol $S_{2CCE5}$ of the control channel element CCE5, an accumulation of the third symbol $S_{3CCE4}$ of the control channel element CCE4 and of the third symbol $S_{3CCE5}$ of the control channel element CCE5 and an accumulation of the fourth symbol $S_{4CCE4}$ of the control channel element CCE4 and of the fourth symbol $S_{4CCE5}$ of the control channel element CCE5.

In case of an additive white Gaussian noise channel (AWGN), the accumulation is an addition. In case of a fading channel, the accumulation is a maximum ratio combining (MRC) and symbol-by-symbol equalisation (by a scalar) is performed. The equalisation may be zero-forcing, minimum mean square error combining (MMSEC), equal-gain combining (EGC) or MRC.

At next step S706, the processor 300 executes a correlation between the accumulations of the first and second parts and calculates the equivalent energy.

The correlation is the standard inter-correlation operation between two different vectors.

The result of the accumulation executed at step 5704 is a vector $V_1$ and the result of the accumulation executed at step S705 is a vector $V_2$.

$$V_1 = \begin{bmatrix} x_1 \\ x_i \\ x_T \end{bmatrix} \text{ and } V_2 = \begin{bmatrix} y_1 \\ y_i \\ y_T \end{bmatrix}.$$

The processor 300 calculates $$\sum_{i=1}^{T} x_i y_i^*$$

and calculates the norm of $$\sum_{i=1}^{T} x_i y_i^*.$$

In a variant, instead of executing a correlation between the accumulation executed of the first and second parts, the processor 300 executes an accumulation of the first and second parts.

At next step S707, the result of the accumulation-correlation steps according to the preferred mode of realisation or the result of the accumulation step according to the variant of realisation is then multiplied by a normalization value in order to ensure that the best metric of the noiseless system allows identifying the allocated subset irrespective of the number L. The normalized result is then memorized in the RAM memory 303.

It has to be noted here that the normalization value is dependent of several parameters like the total number L of control channel elements of the selected subset.

At next step S708, the processor 300 checks if all possible subsets have been processed. If all possible subsets have been processed, the processor 300 moves to step S710.

If at least one possible subset has not been processed, the processor 300 moves to step S709, selects another subset and executes the loop constituted of the steps S703 to 5709 until all possible subsets have been processed.

At step S710, the processor 300 selects the largest normalized result memorized at step S707, i.e. selects the best metric.

At next step S711, the processor 300 checks if the best metric is lower than a threshold. The threshold is computed from the average received power and the comparison is executed in order to evaluate whether only one or several control channel elements have been allocated to the second telecommunication device UE. If the best metric is lower than a threshold, it means that there is a high probability that there is no repetition, the processor 300 moves then to step S740 of the FIG. 7c. If the best metric is not lower than a threshold, it means that there is a high probability that there is at least one repetition, the processor 300 moves then to step S720 of the FIG. 7b.

It has to be noted here that, when the second telecommunication device UE has plural identifiers, the processor 300 executes the present algorithm for each identifier.

Figure 7B:
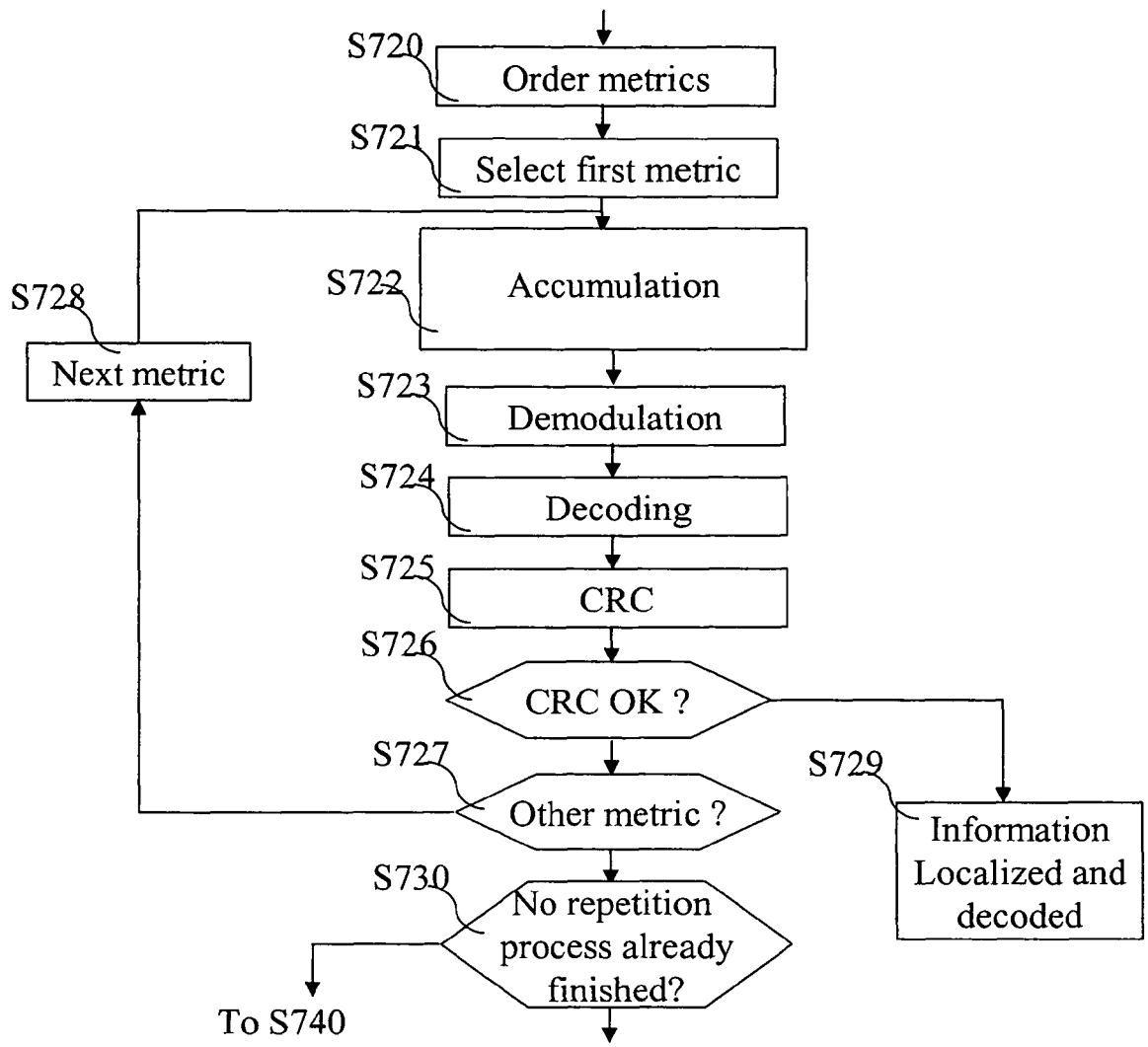
FIG. 7b depicts an algorithm executed by each second telecommunication device according to the first mode of realisation of the present invention.

FIG. 7b depicts an algorithm executed by each second telecommunication device according to the first mode of realisation of the present invention.

More precisely, the present algorithm is executed by the processor 300 of each second telecommunication device UE.

At step S720, the processor 300 orders the normalized results memorized at step S707 of the FIG. 7a from the largest value to the lowest one.

At next step S721, the processor 300 selects the largest normalized results with the corresponding subset from which the selected normalized value is calculated.

At next step S722, the processor 300 determines an accumulation for the L channel elements by executing T accumulations of the L symbols having the same position after the processing of the received data.

It has to be noted here that the accumulation for all the L channel elements is not executed sequentially on the first and second parts as it has been disclosed in the algorithm of the FIG. 7a.

At next step S723, the processor 300 commands the wireless interface 306 in order to demodulate the result of the accumulation step S722 and commands at step S724 the wireless interface 306 in order to decode the demodulated result of the accumulation step S722. The demodulated result is composed of bits and comprises an information and a CRC.

At next step S725, the processor 300 calculates a cyclic redundancy checksum of the demodulated and decoded result of the accumulation step.

At next step S726, the processor 300 checks the cyclic redundancy. If the cyclic redundancy is correct, the processor 300 moves to step S729, the information transferred to the second telecommunication device UE is localized and decoded.

If the cyclic redundancy is not correct, the processor 300 moves to step S727, and checks if there are some remaining normalized results which have not been processed.

It has to be noted here that, all the ordered normalized results are processed or only the ordered normalized results which are higher than a value are processed or only a predetermined number of ordered normalized results are processed.

If the result of the test of step S727 is positive, the processor 300 moves to step S728, selects the following normalized result and executes the loop constituted by the steps S722 to S728 as far as the test of step S727 is negative.

If the test of step S727 is negative, the processor 300 moves to step S730.

Figure 7C:
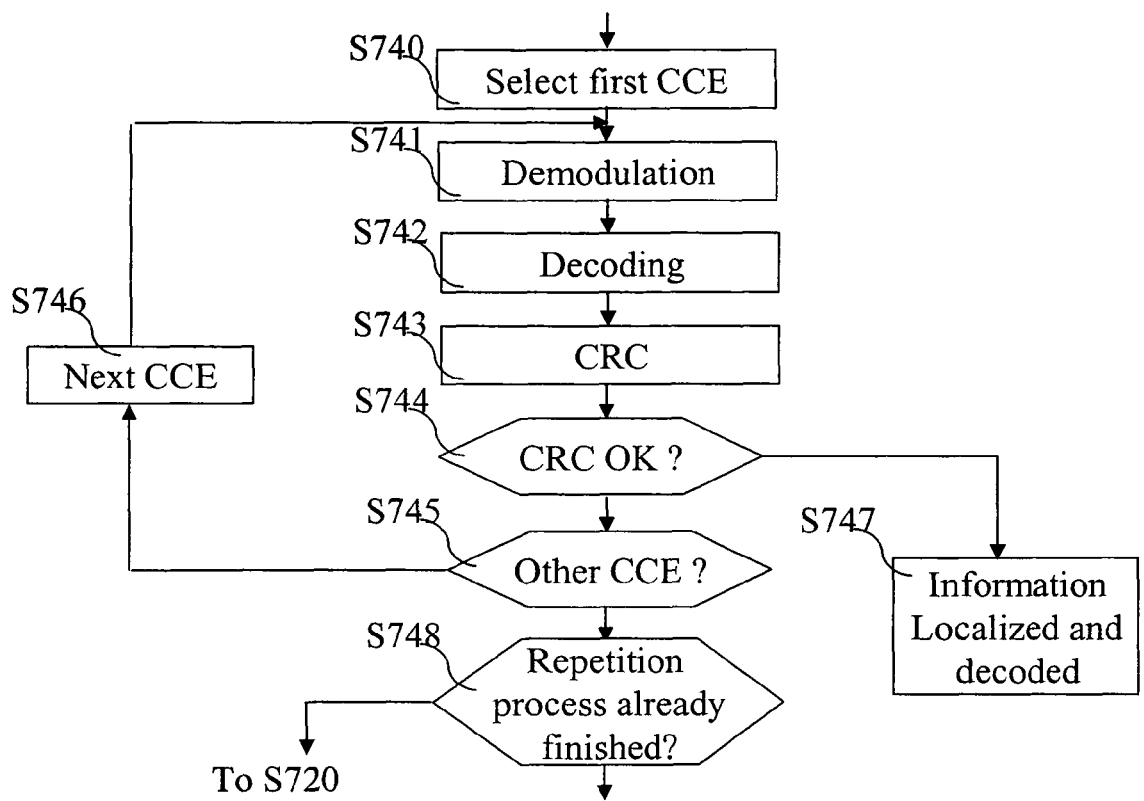
FIG. 7c depicts an algorithm executed by each second telecommunication device according to the first, the second and a third modes of realisation of the present invention.

At step 730, the processor 300 checks if the algorithm of the FIG. 7c has been already executed for the control channel elements received at step S700.

If the algorithm of the FIG. 7c has been already executed for the control channel elements received at step S700, the processor 300 stops the present algorithm.

If the algorithm of the FIG. 7c has not been already executed for the control channel elements received at step S700, the processor 300 moves to step S740 of the FIG. 7c.

It has to be noted here that, thanks to the selection, for each channel element, of a randomisation function according to the position of the channel element and the destination, only the demodulated processed received data on channel element or elements allocated to the destination follow the code structure used for the decoding.

Thanks to that characteristic, instead of executing the algorithms as disclosed in the FIGS. 7a and 7b, the processor 300 executes the steps S700 and S701 of the FIG. 7a, executes an accumulation step for each subset as the one disclosed at step S722 of the FIG. 7b and for each subset or control channel element executes the following steps:

a demodulation step as the one disclosed at step S723 of the FIG. 7b, a decoding metric computation step, wherein the decoding metric increases with the adequacy of the demodulated processed received data and the code structure.

As example, in case of Viterbi decoding, the decoding metric is the variance of the metrics on at least a part of the trellis states after a few Viterbi decoding steps.

The processor 300 sorts the subsets and the control channel elements by decreasing order of the decoding metric and executes from the highest to the lowest decoding metric, the steps S724 to 5729.

FIG. 7c depicts an algorithm executed by each second telecommunication device according to the first, the second and a third modes of realisation of the present invention.

More precisely, the present algorithm is executed by the processor 300 of each second telecommunication device UE.

At step S740, the processor 300 selects the first control channel element of the group of control channel elements.

At next step S741, the processor 300 commands the wireless interface 306 in order to demodulate the processed received data which were mapped on the selected control channel element and commands at step S742 the wireless interface 306 in order to decode the demodulated processed received data. The demodulated and decoded processed received data are composed of bits forming information and a CRC.

At next step S743, the processor 300 calculates the cyclic redundancy.

At next step S744, the processor 300 checks if the cyclic redundancy is correct. If the cyclic redundancy is correct, the processor 300 moves to step S747, the information transferred to the second telecommunication device UE is localized and decoded.

If the cyclic redundancy is not correct, the processor 300 moves to step S745 and checks if there is at least one control channel element which has not been processed.

If there is at least one control channel element which has not been processed, the processor 300 moves to step S746 and selects another control channel element of the group of control channel elements and executes the loop constituted by the step S741 to S746.

If all the control channel elements have not been processed, the processor 300 moves to step S748.

At step S748, the processor 300 checks if the algorithm of the FIG. 7b has been already completed for the control channel elements received at step S700.

If the algorithm of the FIG. 7b has been already completed for the control channel elements received at step S700, the processor 300 stops the present algorithm.

If the algorithm of the FIG. 7b has not been already completed for the control channel elements received at step S700, the processor 300 moves to step S720 of the FIG. 7b. As example, if no normalized results have been processed or only the ordered normalized results which are higher than a predetermined value have been processed or only a predetermined number of ordered normalized results have been processed, the processor 300 moves to step S720 in order to process at least a part of the normalized results which have not been processed yet.

It has to be noted here that, thanks to the selection, for each channel element, of a randomisation function according to the position of the channel element and the destination, only the demodulated processed received data mapped on channel element or elements allocated to the destination follow the code structure used for the decoding.

In a variant of the FIG. 7c, a decoding metric can be defined which increases with the adequacy of the demodulated processed received data and the code structure. The processor 300 determines, for each control channel element, the decoding metric from the received processed demodulated data.

As example, in case of Viterbi decoding, the decoding metric is the variance of the metrics on at least a part of the trellis states after a few Viterbi decoding steps.

The processor 300 sorts the control channel elements by decreasing order of the decoding metric and executes from the highest to the lowest decoding metric the steps S742 to S748.

Figure 7D:
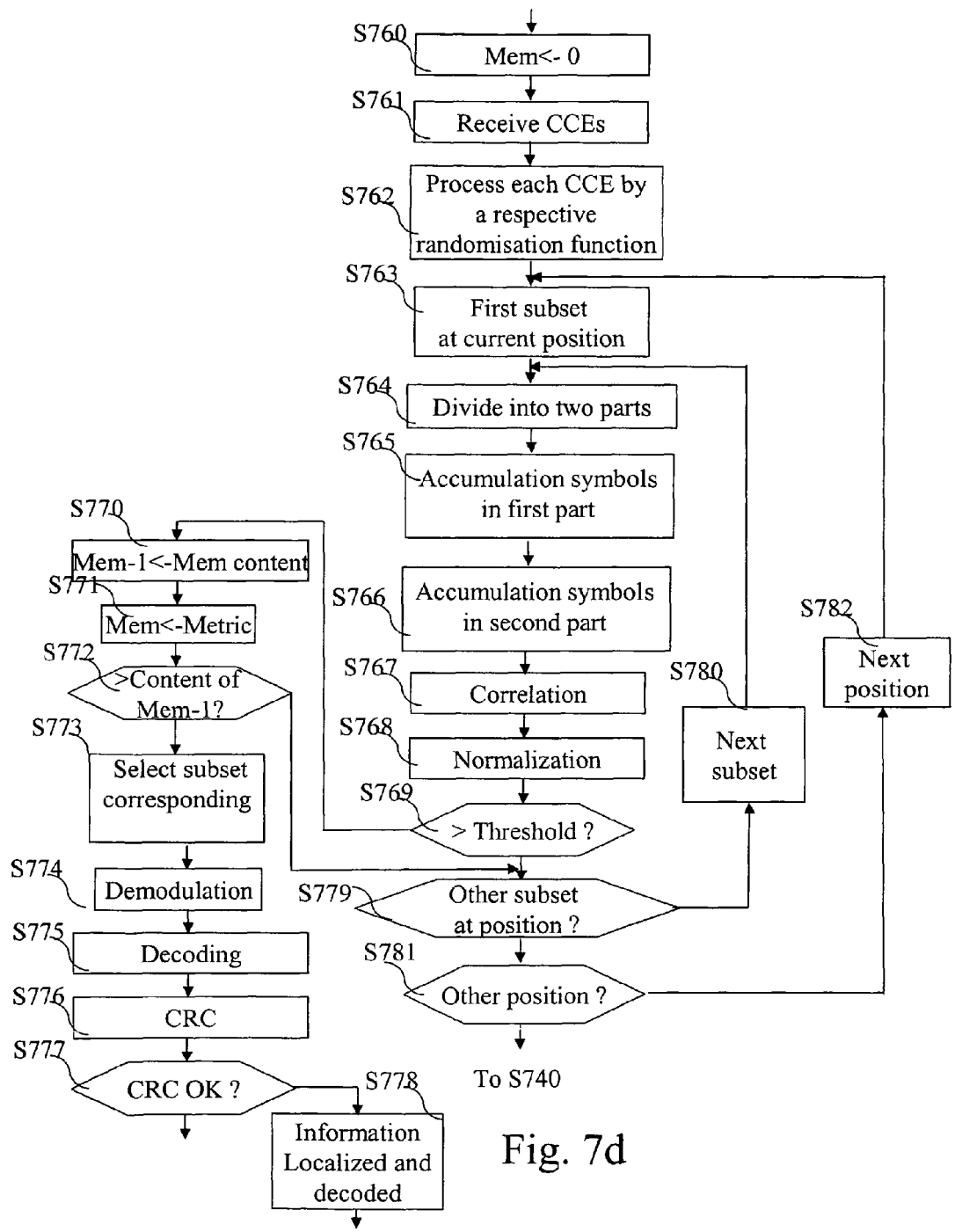
FIG. 7d depicts an algorithm executed by each second telecommunication device according to the third mode of realisation of the present invention.

FIG. 7d depicts an algorithm executed by each second telecommunication device according to the third mode of realisation of the present invention.

More precisely, the present algorithm is executed by the processor 300 of each second telecommunication device UE.

At step S760, the processor 300 sets the content of a register noted Mem to the null value.

At step S761, the processor 300 is informed by the wireless interface 306 of the reception of data mapped on the control channel elements.

At next step S762, the processor 300 obtains for each control channel element, a randomisation function. The randomisation function is a de-scrambling sequence or a de-interleaving function. For each control channel element, the processor 300 reads into the RAM memory or the ROM memory the randomisation function which corresponds to the position of the control channel element in the group of control channel elements as it has been disclosed in reference to the FIG. 5.

In a variant, the processor 300 computes on the fly the randomisation function which corresponds to the position of the control channel element in the group of control channel elements as it has been disclosed in reference to the FIG. 5.

When the second telecommunication device UE has plural identifiers, the processor 300 selects the randomisation function which corresponds to the position of the control channel element in the group of control channel elements for one identifier.

At the same step, the processor 300 commands the wireless interface 306 in order to process the data mapped on each control channel element by the randomisation function which corresponds to the position of the control channel element in the group of control channel elements.

At next step S763, the processor 300 selects a first subset at a current position.

The first subset is as example the one marked with crosses in the column 800 of the FIG. 8. The current position is the position of the control channel element CCE1 in the FIG. 8.

At next step S764, the processor 300 divides the selected subset into a first and a second parts. The first part comprises α control channel element or elements, the second part comprises β control channel element or elements and α+β=L wherein L is the total number of control channel elements of the selected subset.

Preferably, each part comprises L/2 channel elements if L is even or one part comprises (L−1)/2 control channel elements and the other part comprises (L+1)/2 control channel elements if L is odd.

At next step S765, the processor 300 determines an accumulation for the α channel element or elements of the first part by executing T accumulations of the α symbol or symbols having the same position after the processing of the received data, as disclosed at step S704 of the FIG. 7a.

At next step S766, the processor 300 determines an accumulation for the β channel element or elements of the second part by executing T accumulations of the β symbol or symbols having the same position after the processing of the received data as disclosed at step S705 of the FIG. 7a.

At next step S767, the processor 300 executes a correlation between the accumulation executed on the first and second parts as disclosed at step S706 of the FIG. 7a.

In a variant, instead of executing a correlation between the accumulation executed of the first and second parts, the processor 300 executes an accumulation of the first and second parts as disclosed at step S706 of the FIG. 7a.

At next step S768, the result of the accumulation-correlation steps according to the preferred mode of realisation or the result of the accumulation steps according to the variant of realisation is then multiplied by a normalization value in order to ensure that the best metric of the noiseless system allows identifying the allocated subset irrespective of the number L as it has been disclosed at step S707 of the FIG. 7a. The normalized result is then memorized in the RAM memory 303.

At next step S769, the processor 300 checks if the normalized result is higher than or equal to a threshold. The threshold is computed from the average received power and the comparison is executed in order to evaluate whether only one or several control channel elements have been allocated to the second telecommunication device UE. If the normalized result is higher than or equal to the threshold, the processor 300 moves then to step S770. If the normalized result is lower than the threshold, the processor 300 moves then to step S779.

At step S770, the processor 300 memorises the value stored in the register Mem in a register noted Mem-1 of the RAM memory 303.

At next step S771, the processor 300 memorizes the normalized result named also metric in the register Mem.

At next step S772, the processor 300 checks if the content of the register Mem is higher than or equal to the content of the register Mem-1.

If the content of the register Mem is higher than or equal to the content of the register Mem-1, the processor 300 moves to step S779.

If the content of the register Mem is lower than the content of the register Mem-1, the processor 300 moves to step S773.

At step S773, the processor 300 selects the subset from which the normalized value stored in the register Mem-1 has been calculated.

At next step S774, the processor 300 commands the wireless interface 306 in order to demodulate the processed received data mapped on the selected control channel element and commands at step S775 the wireless interface 306 in order to decode the demodulated processed received data. The demodulated and decoded processed received data is composed of bits representative of information and a CRC.

At next step S776, the processor 300 calculates a cyclic redundancy checksum of the information included in the control channel element.

At next step S777, the processor 300 checks if the cyclic redundancy checksum is correct. If the cyclic redundancy checksum is correct, the processor 300 moves to step S778, the information transferred to the second telecommunication device UE is localized and decoded.

If the cyclic redundancy checksum is not correct, the processor 300 stops the present algorithm.

At step S779, the processor 300 checks if there are some other possible subsets which start at the current position which have not been processed. According to the example of the FIG. 8, the subsets comprised in the columns 805, 809, 812 and 814 start at the current position. If all other possible subsets which start at the current position which have been processed, the processor 300 moves to step S781. Otherwise, the processor 300 moves to step S780, selects another subset comprising L+1 control channel elements and starting at the current position and returns to step S764 already described.

At step S781, the processor 300 checks if all possible positions wherein a subset starts have been processed. If all possible positions wherein a subset starts have been processed, the processor 300 moves to step S740 of the FIG. 7c. Otherwise, the processor 300 moves to step S782.

According to the example of the FIG. 8, the positions CCE2 to CCE6 have not processed.

At step S782, the processor 300 selects the following position, i.e. the position CCE2 marked in the column 801 in the FIG. 8 and returns to step S763 already described.

It has to be noted here that, when the second telecommunication device UE has plural identifiers, the processor 300 executes the present algorithm for each identifier.

The present invention has been described in an example wherein the processes are executed on control channel element.

The present invention is also applicable on classical channel elements. Such case occurs as example, when no control channel elements are defined in the telecommunication network. In such case, the first and second telecommunication devices apply the present invention on the channel elements in which are included data.

Naturally, many modifications can be made to the embodiments of the invention described above without departing from the scope of the present invention.

The invention claimed is:

1. A method for allocating, by a telecommunication device, at least first and second channel elements of a group of channel elements of a channel resource to a destination, each channel element being a predefined subdivision of the channel resource, the method comprising, executed by the telecommunication device:

selecting, for the first channel element, a first randomization function according to a position of the first channel element within the group of channel elements and according to the destination; selecting, for the second channel element, a second randomization function according to a position of the second channel element within the group of channel elements and according to the destination; processing data to be included in the first channel element by the first randomization function and processing data to be included in the first channel element by the second randomization function; and transferring the data processed by the first randomization function by mapping the data processed by the first randomization function on the first channel element and the data processed by the second randomization function by mapping the data processed by the second randomization function on the second channel element in combination with other data processed by other randomization functions mapped on other channel elements of the channel resource.

2. A method according to claim 1, wherein the randomization functions are scrambling sequences and the processes of the data are multiplications.

3. A method according to claim 1, wherein the randomization functions are interleaving functions and the processes of the data are permutations.

4. A method according to claim 1, wherein the method is executed for at least two destinations.

5. A method according to claim 1, wherein the data are formed by modulating and coding information combined with a cyclic redundancy of the information.

6. A method according to claim 5, wherein the destination is another telecommunication device or an application executed by the another telecommunication device.

7. A method according to claim 6, wherein the channel elements are control channel elements and the data are representative of a modulation and/or a coding scheme to be used by the destination for a subset of the group of channel elements and/or a location of a subset of the group of channel elements and/or a space time code to be used by the destination for a subset of the group of channel elements.

8. A method according to claim 1, wherein the at least first and the second channel elements are consecutive channel elements in the group of channel elements.

9. A non-transitory computer readable medium, including computer executable instructions, that can be directly loadable into a programmable device for implementing the method according to claim 1, when the computer executable instructions are executed on a programmable device.

10. A method for determining if at least first and second channel elements of a group of channel elements of a channel resource are allocated to a destination by a first telecommunication device, each channel element being a predefined subdivision of the channel resource, the method comprising, executed by the destination:

receiving a group of channel elements on which received data are mapped;

selecting, for the first channel element, a first randomization function according to the position of the first channel element in the group of channel elements;

selecting, for the second channel element, a second randomization function according to the position of the second channel element in the group of channel elements; processing the received data mapped on the first channel element by the first randomization function; processing the received data mapped on the second channel element by the second randomization function;

determining, among the processed received data, at least two identical processed received data obtained from the received data mapped on at least two channel elements of a subset of the group of channel elements; and deciding that the at least two channel elements of the subset of the group of channel elements are allocated to the destination if the at least two processed received data are identical.

11. A method according to claim 10, wherein the randomization functions are de-scrambling sequences and the processes of the data are multiplications.

12. A method according to claim 10, wherein the randomization functions are de-interleaving functions and the processes of the data are permutations.

13. A method according to claim 10, wherein the processed received data corresponding to the received data mapped on each channel element are under a form of I consecutive modulation symbols, and the determination is obtained by:
  selecting each possible subset of the group of channel elements, each subset comprising at least two channel elements, and for each possible subset of the group of channel elements:
    dividing the subset into a first part comprising a channel element or elements and a second part comprising $\beta$ channel element or elements, wherein $\alpha+\beta=L$, L being the number of channel elements comprised in the subset,
    determining an accumulation for the $\alpha$ channel element or elements of the first part by executing I accumulations of the $\alpha$ symbol or symbols having the same position, determining an accumulation for the $\beta$ channel element or elements of the second part by executing I accumulations of the $\beta$ symbol or symbols having the same position; processing results of the accumulations executed on the first and second parts, and
  obtaining a normalized value from the result of the process of the results; selecting a highest normalized value; and comparing the highest normalized value to a threshold.

14. A method according to claim 13, wherein the processing of the accumulations executed on the first and second parts is an accumulation of the accumulations executed on the first part and on the second part.

15. A method according to claim 13, wherein the processing of the accumulations executed on the first and second parts is a correlation of the accumulations executed on the first part and on the second part.

16. A method according to claim 13, wherein $\alpha=\beta=L/2$ or $\alpha=(L-1)/2$ and $\beta=(L+1)/2$.

17. A method according to claim 13, wherein if the highest normalized value is higher than the threshold, the decision is obtained by:
  ordering the normalized values;
  selecting at least a part of the highest normalized values; and as far as the decision is not obtained, from the highest to the lowest selected normalized value:
    determining, for the subset from which the normalized value is obtained, an accumulation for the L channel elements by executing I accumulations of the L symbols having the same position,
    demodulating the results of the accumulations of the L symbols,
    decoding bits resulting from the demodulation in order to obtain information combined with a cyclic redundancy of the information, and
    checking the cyclic redundancy; and
  deciding that the L channel elements of the subset from which the normalized value is obtained are allocated to the destination if the redundancy check is correct.

18. A method according to claim 17, wherein, if no redundancy check is correct for each of the selected values, the method further comprises:
  as far as a decision that one channel element within the group of channel elements is allocated to the destination is not obtained:
    selecting a channel element of the group of channel elements on which received data are mapped,
    demodulating the received data mapped on the selected channel element,
    decoding bits resulting from the demodulation in order to obtain information combined with a cyclic redundancy of the information, and
    checking the cyclic redundancy; and
  deciding that the channel element is allocated to the destination if the cyclic redundancy check is correct.

19. A method according to claim 18, wherein if no decision that one channel element within the group of channel elements is allocated to the destination is obtained, the method further comprises:
  selecting at least a part of the normalized values which do not belong to the part of the highest normalized values;
  and as far as the decision is not obtained, from the highest to lowest selected normalized values of the part of the normalized values that do not belong to the part of the highest normalized values:
    determining, for the subset from which the normalized value is obtained, an accumulation for the L channel elements by executing T accumulations of the L symbols having the same position,
    demodulating the results of the accumulations of the L symbols,
    decoding bits resulting from the demodulation to obtain information combined with a cyclic redundancy of the information, and
    checking the cyclic redundancy; and
  deciding that the L channel elements of the subset from which the normalized value is obtained are allocated to the destination if the redundancy check is correct.

20. A method according to claim 13, wherein if the highest normalized value is lower than the threshold, the decision is obtained by:
  as far as a decision that one channel element within the group of channel elements is allocated to the destination is not obtained:
    selecting a channel element of the group of channel elements on which received data are mapped,
    demodulating the received data mapped on the selected channel element,
    decoding bits resulting from the demodulation in order to obtain information combined with a cyclic redundancy of the information, and
    checking the cyclic redundancy; and
  deciding that the channel element is allocated to the destination if the cyclic redundancy check is correct.

21. A method according to claim 20, wherein if no decision that one channel element within the group of channel elements is allocated to the destination is obtained, the decision is obtained by:
  ordering the normalized values, selecting at least a part of the highest normalized values, and as far as the decision is not obtained, from the highest to the lowest selected normalized values:

determining, for the subset from which the normalized value is obtained, an accumulation for the L channel elements by executing T accumulations of the L symbols having the same position, demodulating the results of the accumulation of the L symbols, decoding bits resulting from the demodulation in order to obtain information combined with a cyclic redundancy of the information, and checking the cyclic redundancy; and deciding if the redundancy check is correct, that the L channel elements of the subset from which the information and the cyclic redundancy are obtained, are allocated to the destination.

22. A method according to claim 10, wherein the processed received data corresponding to the received data mapped on each channel element are under the form of T consecutive modulation symbols and the determination and the decision are obtained by:

selecting a first possible subset of the group of channel elements, the first possible subset comprising at least two channel elements;

dividing the first possible subset into a first part comprising a channel element or elements and a second part comprising $\beta$ channel element or elements, wherein $\alpha+\beta= L$, L being the number of channel elements comprised in the first possible subset, determining an accumulation for the $\alpha$ channel element or elements of the first part of the first possible subset by executing T accumulations of the a symbol or symbols having the same position, determining an accumulation for the $\beta$ channel element or elements of the second part of the first possible subset by executing T accumulations of the $\beta$ symbol or symbols having the same position;

processing the results of the accumulations executed on the first and second parts of the first possible subset;

obtaining a first normalized value from the result of the process of the results;

selecting a second possible subset of the group of channel elements, the second possible subset comprising at least two channel elements, dividing the second possible subset into a first part comprising $\alpha'$ channel element or elements and a second part comprising $\beta'$ channel element or elements, wherein $\beta'+\beta'=L'$, L'being the number of channel elements comprised in the second possible subset, determining an accumulation for the $\alpha'$ channel element or elements of the first part of the second possible subset by executing T accumulations of the $\alpha'$ symbol or symbols having the same position, determining an accumulation for the $\beta'$ channel element or elements of the second part of the second possible subset by executing T accumulations of the $\beta'$ symbol or symbols having the same position;

processing the results of the accumulations executed on the first and second parts of the second possible subset;

obtaining a second normalized value from the result of the process of the results;

checking if the second normalized value is higher than a threshold;

checking if the second normalized value is lower than the first normalized value;

and if the second normalized value is lower than the first normalized value and higher than the threshold:

demodulating the result of the accumulation executed on the first and second parts of the first subset, decoding bits resulting from the demodulation in order to obtain information combined with a cyclic redundancy of the information, checking the cyclic redundancy, and deciding if the redundancy check is correct, that the L channel elements of the first subset are allocated to the destination.

23. A method according to claim 22, wherein $\alpha=\beta=L/2$ and $\alpha'=\beta'=L'/2$ or $\alpha=(L-1)/2$ and $\beta=(L+1)/2$ and $\alpha'=(L'-1)/2$ and $\beta'=(L'+1)/2$.

24. A method according to claim 10, wherein the at least first and the second channel elements are consecutive channel elements in the group of channel elements.

25. A non-transitory computer readable medium, including computer executable instructions, that can be directly loadable into a programmable device, for implementing the method according to claim 10, when the computer executable instructions are executed on a programmable device.

26. A device for allocating at least first and second channel elements of a group of channel elements of a channel resource to a destination, each channel element being a predefined subdivision of the channel resource, the device for allocating being included in a telecommunication device, and comprising:

circuitry configured to:

select, for the first channel element, a first randomization function according to a position of the first channel element within the group of channel elements and according to the destination;

select, for the second channel element, a second randomization function according to a position of the second channel element within the group of channel elements and according to the destination;

process the data to be included in the first channel element by the first randomization function and processing the data to be included in the first channel element by the second randomization function; and transfer the data processed by the first randomization function by mapping the data processed by the first randomization function on the first channel element and the data processed by the second randomization function by mapping the data processed by the second randomization function on the second channel element in combination with other data processed by other randomization functions mapped on other channel elements of the channel resource.

27. A device for determining if at least first and second channel elements of a group of channel elements of a channel resource are allocated to a destination by a first telecommunication device, each channel element being a predefined subdivision of the channel resource, the device for determining being included in a second telecommunication device and comprising:

circuitry configured to:

receive a group of channel elements on which received data have been mapped; select, for the first channel element, a first randomization function according to the position of the first channel element within the group of channel elements; select, for the second channel element, a second randomization function according to the position of the second channel element in the group of channel elements; process the received data mapped on the first channel element by the first randomization function; process the received data mapped on the second channel element by the second randomization function; determine, among the processed received data, at least two identical processed received data obtained from received data mapped on at least two channel elements of a subset of the group of channel elements; and decide that the at least two channel elements of the subset of the group of channel elements are allocated to the destination if the at least two processed received data are identical.

* * * * *

UNITED STATES PATENT AND TRADEMARK OFFICE
CERTIFICATE OF CORRECTION

Page 1 of 1

PATENT NO.      : 8,780,818 B2
APPLICATION NO. : 12/595966
DATED           : *July 15, 2014
INVENTOR(S)     : Nicolas Gresset et al.

It is certified that error appears in the above-identified patent and that said Letters Patent is hereby corrected as shown below:

On the title page, Item (86), the PCT Information is incorrect. Item (86) should read:

--(86)  PCT No.:      PCT/EP2008/003255

§ 371 (c)(1),
(2), (4) Date:    Oct. 21, 2009--

Signed and Sealed this
Twenty-first Day of April, 2015

Michelle K. Lee
*Director of the United States Patent and Trademark Office*